(12) United States Patent
Walker et al.

(10) Patent No.: US 11,144,522 B2
(45) Date of Patent: *Oct. 12, 2021

(54) DATA STORAGE USING VECTORS OF VECTORS

(71) Applicant: Kinaxis Inc., Ottawa (CA)

(72) Inventors: Robert Nigel Walker, Ashton (CA); Marin Creanga, Kanata (CA); Dylan Ellicott, Kanata (CA)

(73) Assignee: Kinaxis Inc., Kanata (CA)

( * ) Notice: Subject to any disclaimer, the term of this patent is extended or adjusted under 35 U.S.C. 154(b) by 154 days.

This patent is subject to a terminal disclaimer.

(21) Appl. No.: 16/391,900

(22) Filed: Apr. 23, 2019

(65) Prior Publication Data

US 2019/0251069 A1 Aug. 15, 2019

Related U.S. Application Data

(63) Continuation-in-part of application No. 14/924,115, filed on Oct. 27, 2015.

(60) Provisional application No. 62/068,938, filed on Oct. 27, 2014.

(51) Int. Cl.
*G06F 16/22* (2019.01)
*H04L 9/32* (2006.01)

(52) U.S. Cl.
CPC ...... *G06F 16/2237* (2019.01); *G06F 16/2255* (2019.01); *G06F 16/2282* (2019.01); *H04L 9/3236* (2013.01)

(58) Field of Classification Search
CPC ............ G06F 16/2237; G06F 16/2255; G06F 16/2282; H04L 9/3236

USPC ........................................................ 707/611
See application file for complete search history.

(56) References Cited

U.S. PATENT DOCUMENTS

| | | | |
|---|---|---|---|
| 4,651,274 A | 3/1987 | Omoda et al. | |
| 4,780,810 A | 10/1988 | Torii et al. | |
| 5,010,477 A | 4/1991 | Omoda et al. | |
| 5,109,499 A | 4/1992 | Inagami et al. | |
| 5,832,288 A | 11/1998 | Wong | |
| 2005/0114295 A1* | 5/2005 | Takashima | G11B 20/00086 |
| 2005/0283711 A1 | 12/2005 | Claseman | |
| 2006/0268442 A1 | 11/2006 | Hutchins et al. | |
| 2007/0283127 A1 | 12/2007 | Kohn | |
| 2010/0049950 A1 | 2/2010 | Gonion et al. | |
| 2010/0058037 A1 | 3/2010 | Gonion et al. | |
| 2011/0093681 A1 | 4/2011 | Gonion et al. | |

(Continued)

*Primary Examiner* — Alford W Kindred
(74) *Attorney, Agent, or Firm* — Stratford Group Ltd.

(57) ABSTRACT

The systems and methods described here can reduce the storage space required (memory and/or disk) to store certain types of data, provide efficient (fast) creation, modification and retrieval of such data, and support such data within the framework of a multi-version database. In some embodiments, the systems and methods can store each field of a set of records as a vector of values, e.g., a data vector. A set of records can be represented using a vector hash vector, or "vhash" vector, wherein each element of the vhash vector contains a unique identifier of a data vector, based on a cryptographic hash of the data vector. A header table can store associations between labels and "vhash" vectors that pertain to those labels. Identical data vectors can be re-used between different record sets or vhash vectors needing that vector, thus saving space.

30 Claims, 17 Drawing Sheets

(56) References Cited

U.S. PATENT DOCUMENTS

| | | | | |
|---|---|---|---|---|
| 2014/0049473 A1* | 2/2014 | Higginson | ............ | G06F 3/0219 |
| | | | | 345/168 |
| 2015/0088902 A1* | 3/2015 | Nilsson | ............... | G06F 16/2272 |
| | | | | 707/745 |
| 2015/0100523 A1* | 4/2015 | Hellstrom | ............ | G05B 13/026 |
| | | | | 706/11 |
| 2015/0193431 A1* | 7/2015 | Stoytchev | .............. | G16B 20/00 |
| | | | | 704/9 |
| 2016/0378750 A1* | 12/2016 | Legler | ................. | G06F 16/2255 |
| | | | | 707/747 |

* cited by examiner

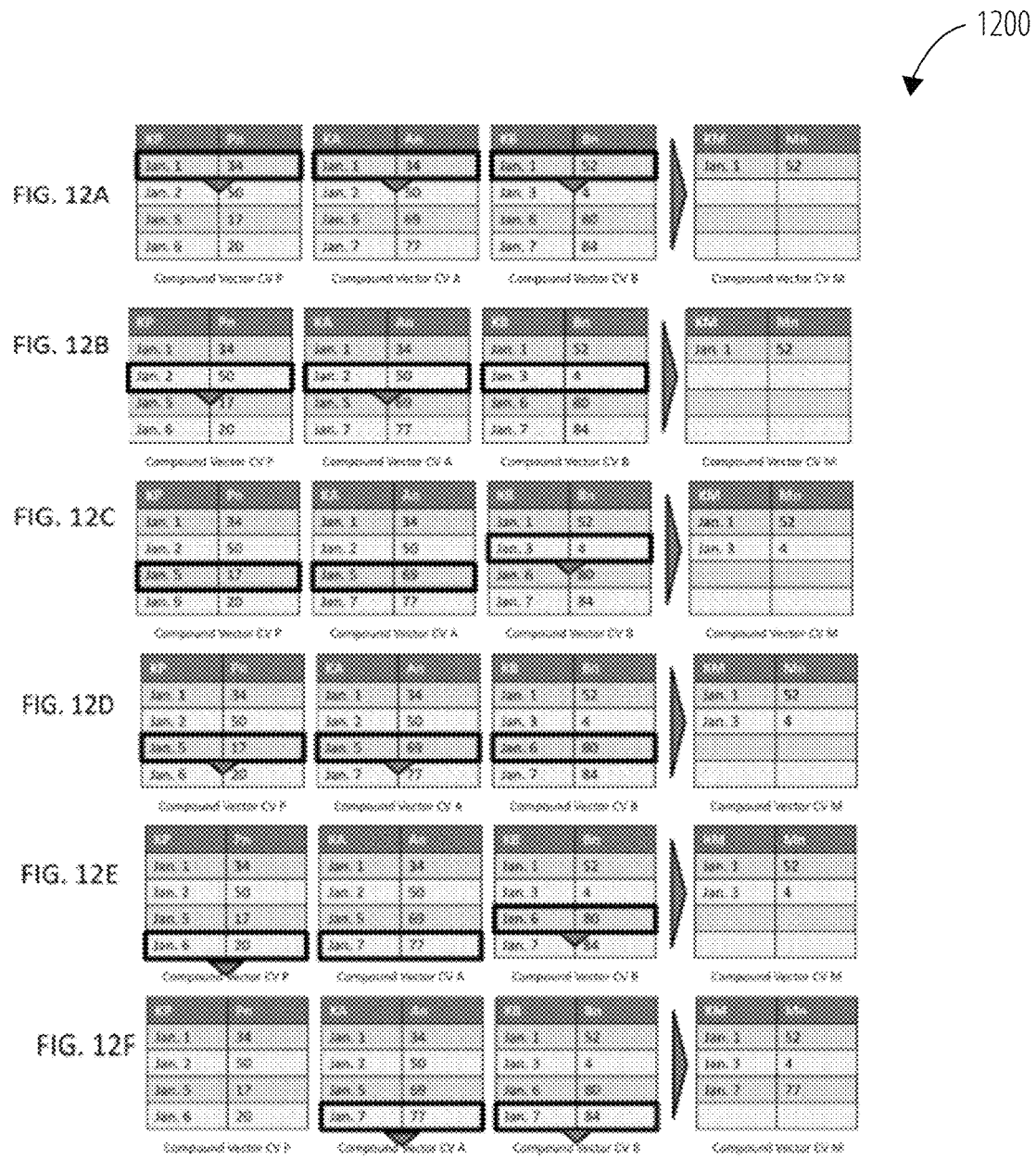

DATA STORAGE USING VECTORS OF VECTORS

CROSS-REFERENCE TO RELATED APPLICATIONS

This application is a continuation-in-part of U.S. application Ser. No. 14/924,115 which claims benefit under 35 U.S.C. § 119(e) of U.S. Provisional Patent Application No. 62/068,938, filed Oct. 27, 2014, entitled "Data Storage Using Vectors of Vectors". The content of both applications is incorporated herein by reference in their entirety.

BACKGROUND

Current products are known to store all table data as discrete records or rows of data. To achieve high-performance and low-storage characteristics, systems have stored each reference to a related record explicitly in memory. On any referenced record, a corresponding "set" structure is used to directly access all the records that refer to that specific record. Known products can provide support for a multi-version feature in the same way for all tables. Specifically, a change to any field on that record causes a new version of the record to be created that contains the changed data for those fields. Thus, in order to retrieve a series of sequential data, each record is found and then resolved to its correct "version."

BRIEF SUMMARY

In one aspect, the present disclosure is directed at a computer system. The computer system can comprise at least one memory comprising: a first set of two or more data vectors, each data vector having: i) a sequence of elements, wherein each element in each data vector can be configured to store a payload of data; and ii) a unique identifier based on a cryptographic hash of the sequence of elements; and a first vector hash (vhash) vector having a sequence of elements, wherein each element of the first vhash vector can be configured to store one of the unique identifiers. The computer system can also comprise at least one processor for directing the memory to store the first set of two or more data vectors, and the first vhash vector.

In some embodiments of the computer system, the cryptographic hash can be at least 16 bytes, or the cryptographic hash can be at 20 bytes.

In some embodiments of the computer system, one of the two or more data vectors can be a key vector, wherein each of the two or more data vectors can be sorted according to an order determined by the key vector.

In some embodiments of the computer system, the at least one memory can further comprise a first header table that stores an association between a first key label and a unique memory location reference associated with the first vhash vector.

In some embodiments of the computer system, the at least one memory can further comprise a second vhash vector associated with a second key label, the second vhash vector having a sequence of elements, wherein each element in the second vhash vector can be configured to store a unique identifier associated with a data vector, the unique identifier based on a cryptographic hash of the data vector. The at least one memory can also comprise a second header table that stores an association between the second key label and a unique memory location reference associated with the second vhash vector.

In some embodiments of the computer system, at least one element in the second vhash vector can store the unique identifier associated with a data vector of the first set of data vectors.

In some embodiments of the computer system, the at least one processor can be configured to determine a proposed new data vector to be referenced by the second vhash vector; and determine whether the at least one memory is already storing the proposed new data vector by comparing a cryptographic hash of the proposed new data vector with the cryptographic hash of each data vector already stored in the at least one memory. When the at least one memory is already storing a matching data vector, the at least one processor can store a unique memory location reference associated with the matching data vector in the second vid vector. When the at least one memory is not already storing a matching data vector, the at least one processor can store the proposed new data vector in the at least one memory, and store a unique identifier associated with the cryptographic hash of the proposed new data vector in the second vhash vector.

In some embodiments of the computer system, each data vector in the first set of data vectors can comprise a subset of elements associated with a first group label. The at least one memory can further comprise a third header table that stores an association between the first group label and a unique memory location reference associated with the first vhash vector.

In some embodiments of the computer system, each element in the second vhash vector can store a unique identifier associated with a data vector having a subset of elements associated with the first group label. The third header table can further store an association between the first group label and a unique memory location reference associated with the second vhash vector.

In some embodiments of the computer system, the first vhash vector can be associated with one version. The at least one memory can further comprise a second vhash vector associated with a second version, the second vhash vector having a sequence of elements, wherein each element in the second vhash vector can be configured to store a unique identifier associated with a data vector, based on a cryptographic hash of the data vector. The first header table can further store an association between the first vhash vector and the one version, and an association between the second vhash vector and the second version.

In another aspect, the present disclosure is directed at a method of storing data. The method can comprise storing, in at least one memory, a first set of two or more data vectors, each data vector having: i) a sequence of elements, wherein each element in each data vector can be configured to store a payload of data; and ii) a unique identifier based on a cryptographic hash of the sequence of elements. The method can further comprise storing, in the at least one memory, a first vector hash (vhash) vector having a sequence of elements, wherein each element in the first vhash vector can be configured to store one of the unique identifiers.

In some embodiments of the method, the cryptographic hash can be at least 16 bytes, or the cryptographic hash can be at 20 bytes.

In some embodiments of the method, one of the two or more data vectors can be a key vector, and each of the two or more data vectors can be sorted according to an order determined by the key vector.

In some embodiments, the method can further comprise storing, in the at least one memory, a first header table that stores an association between a first key label and a unique memory location reference associated with the first vhash vector.

In some embodiments, the method can further comprise storing, in the at least one memory, a second vhash vector associated with a second key label, the second vhash vector having a sequence of elements, wherein each element in the second vhash vector can be configured to store a unique identifier associated with a data vector. The method can also further comprise storing, in the at least one memory, a second header table that stores an association between the second key label and a unique memory location reference associated with the second vhash vector.

In some embodiments of the method, at least one element in the second vhash vector can store the unique identifier associated with a data vector of the first set of data vectors.

In some embodiments, the method can further comprise determining a proposed new data vector to be referenced by the second vhash vector and determining whether the at least one memory is already storing by comparing a cryptographic hash of the proposed new data vector with the cryptographic hash of each data vector already stored in the at least one memory. When the at least one memory is not already storing proposed new data vector, the method can comprise storing the proposed new data vector in the at least one memory, and storing a unique identifier associated with the cryptographic hash of the proposed new data vector in the second vhash vector.

In some embodiments of the method, each data vector in the first set of data vectors can comprise a subset of elements associated with a first group label. The method can also further comprise storing, in the at least one memory, a third header table that stores an association between the first group label and a unique memory location reference associated with the first vhash vector.

In some embodiments of the method, each element in the second vhash vector can store a unique identifier associated with a data vector having a subset of elements associated with the first group label. The method can also further comprise storing, in the third header table, an association between the first group label and a unique memory location reference associated with the second vhash vector.

In some embodiments of the method, the first vhash vector can be associated with one version. The method can further comprise storing, in the at least one memory, a second vhash vector associated with a second version, the second vhash vector having a sequence of elements, wherein each element in the second vhash vector can be configured to store a unique identifier associated with a data vector. The method can also further comprise storing, in the first header table, an association between the first vhash vector and the one version, and an association between the second vhash vector and the second version.

In yet another aspect, the present disclosure is directed to at least one memory. The at least one memory can comprise a first set of two or more data vectors, each data vector having: i) a sequence of elements, wherein each element in each data vector can be configured to store a payload of data; and ii) a unique identifier based on a cryptographic hash of the sequence of elements. The at least one memory can further comprise a first vector hash (vhash) vector having a sequence of elements, wherein each element in the first vhash vector can be configured to store one of the unique identifiers.

In some embodiments of the at least one memory, the cryptographic hash can be at least 16 bytes, or the cryptographic hash can be at 20 bytes.

In some embodiments of the at least one memory, one of the two or more data vectors can be a key vector, and each of the two or more data vectors can be sorted according to an order determined by the key vector.

In some embodiments, the at least one memory can further comprise storing, in the at least one memory, a first header table that can store an association between a first key label and a unique memory location reference associated with the first vhash vector.

In some embodiments, the at least one memory can further comprise a second vhash vector associated with a second key label, the second vhash vector having a sequence of elements, wherein each element in the second vhash vector can be configured to store a unique memory identifier associated with a data vector. The at least one memory can also further comprise a second header table that stores an association between the second key label and a unique memory location reference associated with the second vhash vector.

In some embodiments of the at least one memory, at least one element in the second vhash vector can store the unique identifier associated with a data vector of the first set of data vectors.

In some embodiments of the at least one memory, each data vector in the first set of data vectors can comprise a subset of elements associated with a first group label. The at least one memory can also further comprise a third header table that stores an association between the first group label and a unique memory location reference associated with the first vhash vector.

In some embodiments, each element in the second vhash vector can store a unique identifier associated with a data vector having a subset of elements associated with the first group label. The third header table can further store an association between the first group label and a unique memory location reference associated with the second vhash vector.

In some embodiments, the first vhash vector can be associated with one version. The at least one memory can further comprise a second vhash vector associated with a second version, the second vhash vector having a sequence of elements, wherein each element in the second vhash vector can be configured to store a unique identifier e associated with a data vector based on a cryptographic hash of the data vector. The first header table can further store an association between the first vhash vector and the one version, and an association between the second vid vector and the second version.

BRIEF DESCRIPTION OF THE DRAWINGS

To easily identify the discussion of any particular element or act, the most significant digit or digits in a reference number refer to the figure number in which that element is first introduced.

FIGS. 11A and 11B list an exemplary set of rules that can be used to implement a merge operation, according to some embodiments.

FIGS. 12A, 12B, 12C, 12D, 12E, and 12F depict how exemplary rules implementing a merge operation can be applied to a set of exemplary compound vectors, according to some embodiments.

DETAILED DESCRIPTION

The systems and methods described here can reduce the storage space (e.g., on memory and/or disk) required to store certain types of data, provide efficient (e.g., fast) creation, modification and retrieval of such data, and support such data within the framework of a multi-version database. This can be done using a vector-based implementation of database tables and records. As described herein, a "vector" can be a data structure in memory that stores data in an ordered sequence of elements, wherein each element can store data, such as a string, an integer, a floating point decimal, references to memory locations, Boolean data, or other data types. Vectors can have any arbitrary length, such as zero elements, one element, two elements, or hundreds, thousands, millions, or more elements.

In the systems and methods described here:

1. Each field in a vector set can be stored as a vector of values—i.e., there is one value in the vector for each "record" in the set.

2. Multi-version merge and conflict-resolution can be done on the vectors, without the benefit of record IDs.

3. A vector can be a reference-counted global resource, which can be re-used by all instances having identical values. This pooling of resources benefits instances of repeated vectors in any vector set.

4. A set can be represented as a vector of vectors—and hence the storage of the set itself naturally benefits from the same vector re-use.

5. Other than identifying "vector" data in the data model definition (which in some embodiments can be seen only by an administrator), vector data can continue to appear to users as if individual records were stored.

The systems and methods described here can allow one or more of the following benefits:

1. They can reduce the storage space required.

2. Traversal of vector sets can typically be faster because processors retrieve a block of memory at a time. A vector can be stored in consecutive memory locations, and so much of the data for a vector set will be available in the processor cache once any portion of it is retrieved.

3. Identical vector "columns" can be re-used between different elements of data needing that vector. For example, if a summary of data is to be stored in weekly "buckets", then the date "vector" can be identical for many date/quantity sets. Therefore, the same date vector data can be re-used for each of those date/quantity sets. This brings further space savings.

4. Vector re-use can also provide further speed improvement, as fewer blocks of memory need to be loaded and kept in the processor cache.

Figure 1:
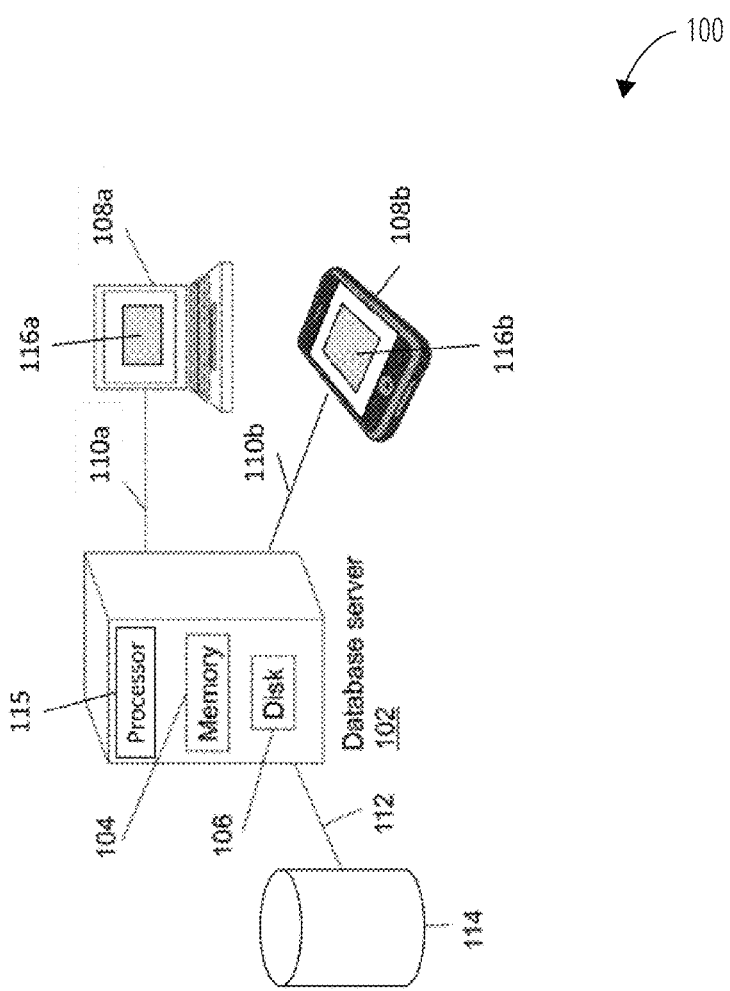
FIG. 1 illustrates an example of a system for storing and viewing databases, according to some embodiments.

Turning to the figures, FIG. 1 illustrates a non-limiting example of a system 100 for storing and viewing databases in accordance with certain embodiments of the present disclosure. System 100 includes a database server 102, a database 114, and client devices 108a and 108b. Database server 102 can include a memory 104, a disk 106, and one or more processors 115. In some embodiments, memory 104 can be volatile memory, compared with disk 106 which can be non-volatile memory. In some embodiments, database server 102 can communicate with database 114 using interface 112. Database can be a versioned database or a database that does not support versioning. While database 114 is illustrated as separate from database server 102, database 114 can also be integrated into database server 102, either as a separate component within database server 102, or as part of at least one of memory 104 and disk 106. A versioned database can refer to a database which provides numerous complete delta-based copies of an entire database. Each complete database copy represents a version. Versioned databases can be used for numerous purposes, including simulation and collaborative decision-making.

System 100 can also include additional features and/or functionality. For example, system 100 can also include additional storage (removable and/or non-removable) including, but not limited to, magnetic or optical disks or tape. Such additional storage is illustrated in FIG. 1 by memory 104 and disk 106. Storage media can include volatile and nonvolatile, removable and non-removable media implemented in any method or technology for storage of information such as computer-readable instructions, data structures, program modules or other data. Memory 104 and disk 106 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media can be part of system 100.

System 100 can also include interfaces 110a, 110b, and 112. Interfaces 110a-b and 112 can allow components of system 100 to communicate with each other and with other devices. For example, database server 102 can communicate with database 114 using interface 112. Database server 102 can also communicate with client devices 108a and 108b via interfaces 110a and 110b, respectively. Client devices 108a and 108b can be different types of client devices; for example, client device 108a can be a desktop or laptop, whereas client device 108b can be a mobile device such as a smartphone or tablet with a smaller display. Non-limiting example interfaces 110a-b, and 112 can include wired communication links such as a wired network or direct-wired connection, and wireless communication links such as cellular, radio frequency (RF), infrared and/or other wireless communication links. Interfaces 110a-b and 112 can allow database server 102 to communicate with client devices 108a-b over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 110a-b and 112 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 112, database server 102 can retrieve data from database 114. The retrieved data can be saved in disk 106 or memory 104. In some cases, database server 102 can also comprise a web server, and can format resources into a format suitable to be displayed on a web browser. Database server 102 can then send requested data to client devices 108a-b via interfaces 110a-b to be displayed on an application 116a-b. Application 116a-b can be a web browser or other application running on client devices 108a-b.

Figure 2:
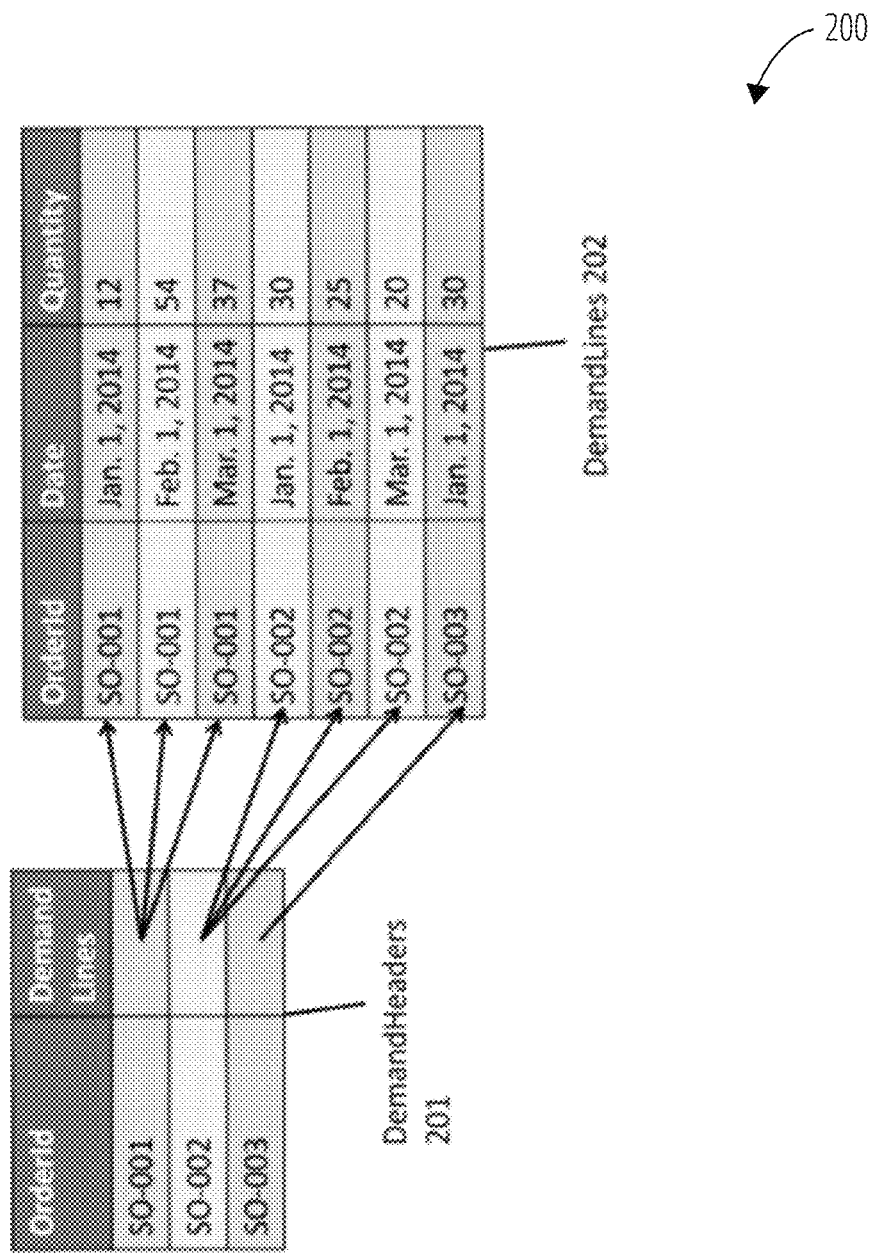
FIG. 2 shows an exemplary non-vector implementation of database records, according to some embodiments.

FIG. 2 shows an exemplary non-vector implementation of database records, according to some embodiments. These database records can be stored at database 114, in memory 104, and/or disk 106. For ease of explanation, FIG. 2 and other related figures describe an exemplary database of orders for parts, including information regarding dates, quantities, and part types. However, the systems, apparatus and methods described herein can be generalized, with appropriate modifications, to any arbitrary database. FIG. 2 includes a DemandHeaders table 201 and a DemandLines table 202; both depicted tables can be logical representations of data structures stored in database memory. DemandLines table 202 can include three columns: a "key label" column such as the "OrderId" column, a Date column, and a Quantity column. Each record (e.g., row) in DemandLines table 202 can refer to a different order. The "key label" column can include data used to match each record with records in other tables. In this case, the "key label" column is the OrderId column, which can store labels (e.g., Order ID) used to distinguish one set of orders from another. For example, Order ID can be used to distinguish between orders originating from different customers, or orders pertaining to different products or projects. The Date column can contain dates associated with each unique order, and the quantity column can contain quantities associated with each order.

DemandHeaders table 201 can contain two columns: a "key label" column, such as an OrderId column, and a DemandLines column. Each record (e.g., row) in DemandHeaders table 201 can contain data pertaining to a different key label (e.g., OrderId). The OrderId column in DemandHeaders table 201 can contain the same Order ID's stored in the OrderId column of DemandLines table 202, except that each OrderId can appear only once in DemandHeaders table 201 (whereas they can appear multiple times in DemandLines table 202). Every record (e.g., row) in the DemandLines column can store zero, one or more references to specific records (e.g., rows) in DemandLines table 202. For example, for the record in DemandHeaders table 201 corresponding to OrderId SO-001, the DemandLines column can contain three separate references to three separate records in DemandLines table 202: (i) the record in DemandLines table 202 pertaining to the SO-001 order dated Jan. 1, 2014, with quantity "12"; (ii) the record in DemandLines table 202 pertaining to the SO-001 order dated Feb. 1, 2014, with quantity "54"; and (iii) the record in DemandLines table 202 pertaining to SO-001 order dated Mar. 1, 2014, with quantity "37." Each of these three separate references are illustrated in FIG. 2 using a separate arrow linking DemandHeaders table 201 and DemandLines table 202. Similarly, the DemandLines column in DemandHeaders table 201 can also contain separate references pertaining to OrderId's SO-002 and SO-003, as illustrated by further arrows linking DemandHeaders table 201 and DemandLines 202.

In operation, DemandHeaders table 201 and DemandLines table 202 can be used together to look up specific orders related to different OrderId's. For example, if a user desires to search for all records pertaining to a particular key label, such as OrderId SO-001, the system can first look up DemandHeaders table 201 to determine the location of all records pertaining to SO-001. Once the system has determined the correct locations, the system can then navigate to the records in DemandLines table 202 containing the records (e.g., rows) corresponding to orders that have OrderId SO-001.

Figure 3:
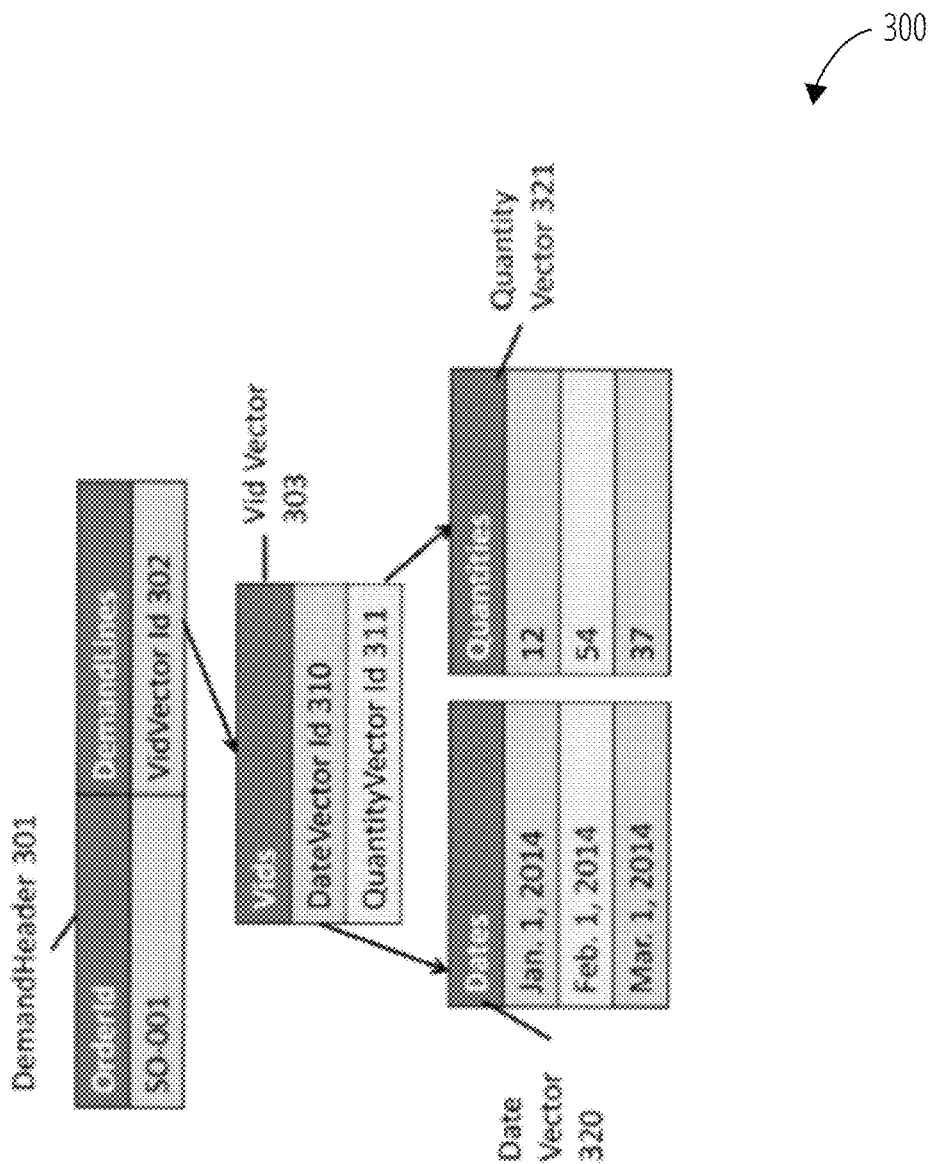
FIG. 3 shows an exemplary vector implementation of database records, according to some embodiments.

FIG. 3 shows an exemplary vector implementation of database records, according to some embodiments. The vector implementation of a database can also be implemented at database 114, disk 106, and/or memory 104. FIG. 3 differs from FIG. 2 in that instead of including two database tables, FIG. 3 includes one table, i.e., DemandHeader table 301, as well as a plurality of vectors, i.e., "Vid" Vector 303, Date Vector 320, and Quantity Vector 321.

DemandHeader table 301 can also include two columns: an OrderId column and a DemandLines column. The OrderId column can contain OrderId's, such as SO-001. However, instead of storing a plurality of memory references, wherein each reference relates to a separate record in another table, the DemandLines column can store, for each record (e.g., row), a memory reference that points to a vector. For instance, the DemandLines column can store a memory reference, denoted as VidVector Id 302. A "memory reference" can be an identifier that uniquely identifies a location in database memory; in some embodiments, memory references can be a unique 64-bit memory location ID. As discussed above, a "vector" can be a data structure in memory that stores data in an ordered sequence of elements, wherein each element can store data, such as a string, an integer, a floating point decimal, references to memory locations, Boolean data, or other data types. Vectors can have any arbitrary length, such as zero elements, one element, two element, or hundreds, thousands, millions, or more elements.

In the depicted example, DemandHeader table 301 stores an association between OrderId SO-001 and memory reference VidVector Id 302. VidVector Id 302 points to Vid Vector 303. Vid Vector 303 can be a vector having two elements. The first element can be a DateVector Id 310, which can contain a memory reference to a Date Vector 320, while the second element can be a QuantityVector Id 311, which can contain a memory reference to a Quantity Vector 321. Vid Vector 303 can therefore be considered a "Vector ID" Vector (e.g., "vid" vector) because it is a vector that stores memory references to other vectors. In the depicted example, Date Vector 320 can in turn be a vector with three elements storing three dates: "Jan. 1, 2014", "Feb. 1, 2014", and "Mar. 1, 2014." Quantity Vector 321 can also be a vector with three elements storing three quantities: "12", "54" and "37." Date Vector 320 and Quantity Vector 321 can therefore be considered data vectors, as each sequence in the vector contains a data payload.

Although not shown in FIG. 3, a vector-based database can also contain DemandHeader tables for OrderId's SO-002 and SO-003. Each DemandHeader Table for SO-002 and SO-003 can contain VidVector Id's to other Vid Vectors similar to Vid Vector 303. Each Vid Vector can also contain DateVector Id's and Quantity Vector Id's similar to DateVector Id 310 and QuantityVector Id 311, respectively. Each DateVector Id and Quantity Vector Id can also point to Date Vectors and Quantity Vectors similar to Date Vector 320 and Quantity Vector 321, respectively.

In operation, DemandHeader table 301, Vid Vector 303, Date Vector 320 and Quantity Vector 321 can be used together to look up specific orders related to different OrderId's. For example, if a user desires to search for all records pertaining to OrderId SO-001, the system can first look up DemandHeader table 301 to determine the Vid Vector associated with SO-001. Once the system reads the memory reference located at VidVector Id 302, the system can navigate to Vid Vector 303. At Vid Vector 303, the system can read the memory references stored at DateVector Id 310 and QuantityVector Id 311, and using those references, navigate to Date Vector 320 and Quantity Vector 321. By reading the contents of Date Vector 320, the system can determine all the dates associated with orders having OrderId SO-001. Similarly, by reading the contents of Quantity Vector 321, the system can determine all the quantities associated with orders having OrderId SO-001. Furthermore, the elements of Quantity Vector 321 can be sorted according to the dates contained in Date Vector 320, such that the system can further determine that the quantity "12" is associated with the order associated with "Jan. 1, 2014", the quantity "54" is associated with the order associated with "Feb. 1, 2014", and the quantity "37" is associated with the order associated with "Mar. 1, 2014."

Vector-based implementations for storing records can have several advantages over non-vector-based implementations. For example, non-vector-based implementations can require storing a key label (e.g., an OrderId) column as part of DemandLines table 202. With vector-based implementations, there can be no need to store a corresponding key label vector. This is because when the system navigates to Vid Vector 303, it will have reached Vid Vector 303 by looking up DemandHeader 301, and will therefore know that Vid Vector 303, and Date Vector 320 and Quantity Vector 321 which Vid Vector 303 references, all pertain to a particular key label, such as OrderId SO-001. In other words, the system will always know the "context" behind its access of Vid Vector 303, Date Vector 320, and Quantity Vector 321. There is therefore no need to store a corresponding key label, such as OrderId in FIG. 2, for each record, which saves memory space. Furthermore, whereas each record in the DemandLines column of DemandLines table 202 had to store multiple memory references (e.g., one for each record in DemandLines table 202 pertaining to a specific OrderId), the DemandLines column of DemandHeader table 301 can, in some embodiments, contain a single memory reference: VidVector Id 302. This results in further memory space savings. Yet another way in which vector-based implementations can save space relative to non-vector implementations is by compressing vectors using run-length encoding. Since vectors can sometimes comprise sequences of data that exhibit a degree of regularity or predictability, such vectors can be amenable to compression using run-length encoding.

Another advantage of vector-based implementations is that they can store data having repeated data fields more efficiently than non-vector-based implementations. For certain types of data, sequences of values can sometimes occur with a degree of repeatability or predictability. For instance, if orders are placed on a specific day each month, order records for different part types, projects, and/or customers can all have date fields that are identical to each other, such as "Jan. 1, 2014", "Feb. 1, 2014", and "Mar. 1, 2014." Or, if a database is keeping track of sales activities, and sales are kept track of on a monthly basis, all sales orders, regardless of part type, project, and/or customer, will all have identical date fields (again, such as "Jan. 1, 2014", "Feb. 1, 2014", and "Mar. 1, 2014"). In yet another example, if a customer always orders the same quantities of certain products, such as a retailer that always orders 100 red widgets and 100 blue widgets every month, the quantities for both types of products will both be recorded as "100", "100", "100", etc. When storing records that have data fields that occur with a degree of repeatability or predictability, vector-based implementations can save space by re-using vectors.

Figure 4:
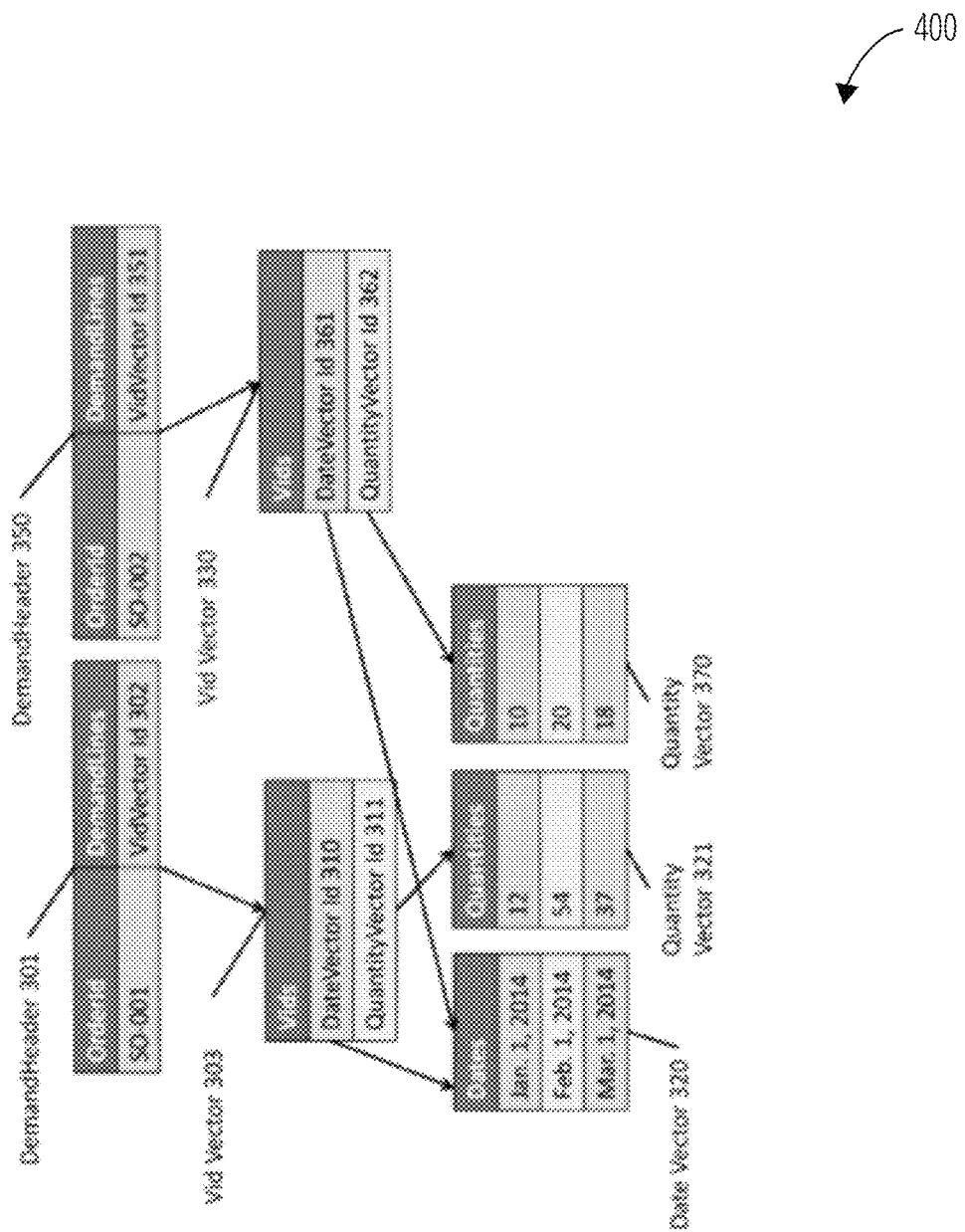
FIG. 4 shows another vector implementation of database records that illustrates an example of vector re-use, according to some embodiments.

FIG. 4 depicts another vector implementation of database records that illustrates an example of vector re-use, according to some embodiments. This vector database can be implemented at database 114, memory 106, and/or disk 106. For ease of explanation, FIG. 4 builds upon the example dataset and data structures described with regards to FIGS. 2 and 3. For example, just as in FIG. 3, FIG. 4 also includes DemandHeader 301 storing an association between OrderId SO-001 and VidVector Id 302, VidVector 303 storing an association between DateVector Id 310 and QuantityVector Id 311, and Date Vector 320 and Quantity Vector 321. These tables, memory references, and vectors can be configured similarly to those tables, memory references and vectors described above in relation to FIG. 3.

In addition to these previously-described elements, FIG. 4 also includes a DemandHeader table 350. DemandHeader table 350 can store an association between OrderId SO-002 and VidVector Id 351. Similar to VidVector Id 302, VidVector 351 can also be a memory reference that points to a Vid Vector—in this case, Vid Vector 330. Similar to Vid Vector 303, VidVector 330 can be a two-element vector that stores two memory references: a first reference DateVectorId 361 to a date vector, and a second reference QuantityVector Id 362 to a Quantity Vector 370. Similar to Quantity Vector 321, which stores quantities of orders associated with OrderId SO-001, Quantity vector 370 can store quantities of orders associated with OrderId SO-002, i.e., "10", "20" and "18."

Referring back to FIG. 2, it can be observed that the order records associated with OrderId SO-002 has a date progression that is identical to the order records associated with OrderId SO-001—both types of records have the date progression "Jan. 1, 2014", "Feb. 1, 2014", and "Mar. 1, 2014." In the non-vector implementation described in FIG. 2, DemandLines table 202 must devote space to storing the sequence "Jan. 1, 2014", "Feb. 1, 2014", and "Mar. 1, 2014" twice: once for orders related to SO-001, and once for orders related to SO-002. In contrast, in the vector-based database depicted in FIG. 4, this date progression is stored only once, e.g., in Date Vector 320. Instead of creating and storing a new vector having a redundant date progression, DateVector Id 361, which is associated with OrderId SO-002, can point to the same Date Vector 320 which stores the dates associated with OrderId SO-001. In this way, Date Vector 320 is "re-used" by the database to store information pertaining to two OrderId's, which saves space.

To achieve this re-use, vectors can be stored as a "pool" so they can be shared by different records. In some embodiments, a database can also compute hashes of each vector in the pool, which can be used to facilitate determining whether a new vector needs to be created and referenced, or whether an existing vector can be re-used.

Figure 5:
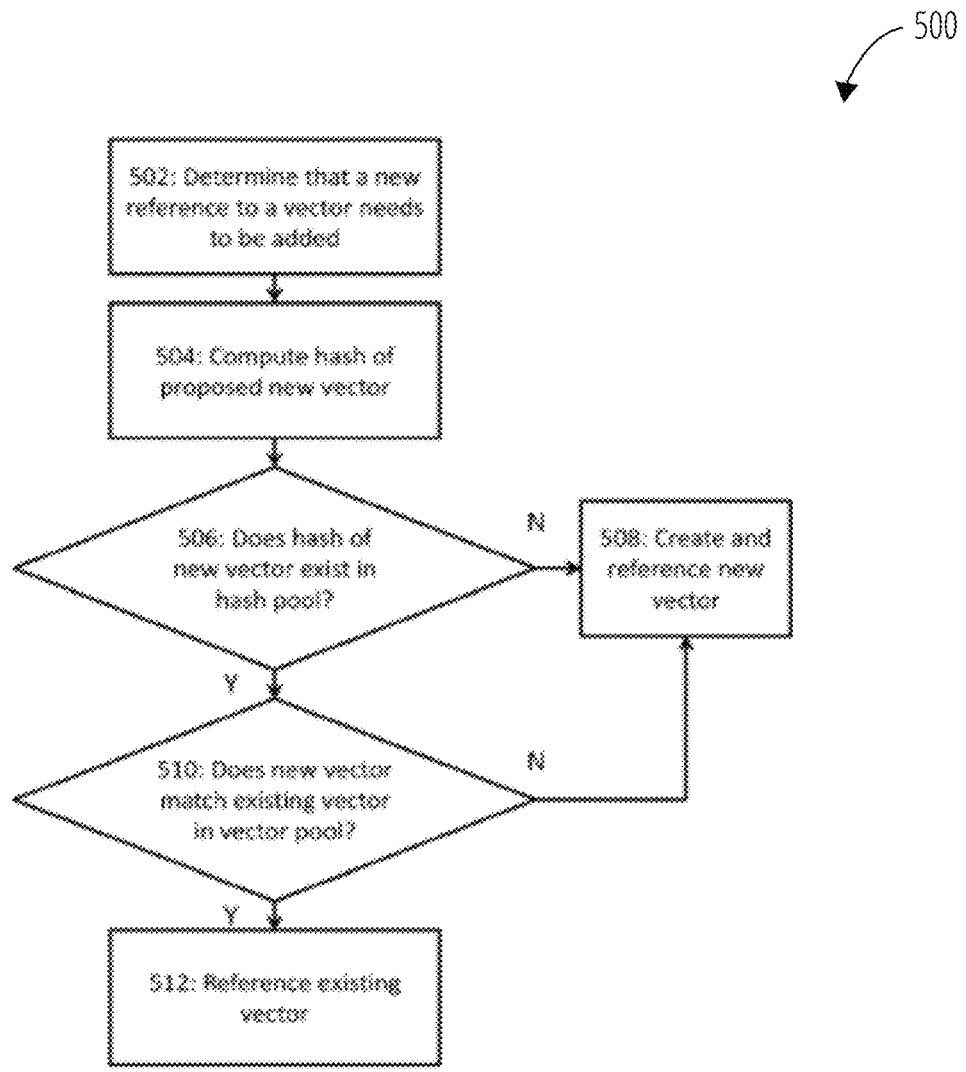
FIG. 5 shows an exemplary process by which a vector implementation of a database can determine whether a new vector needs to be created, or whether an existing vector can be re-used, according to some embodiments.

FIG. 5 depicts an exemplary process 500 by which a vector implementation of a database can determine whether a new vector needs to be created, or whether an existing vector can be re-used, according to some embodiments. At step 502, process 500 can determine that a new reference to a vector needs to be added. This can be because a new record is being added, or because an existing record is being modified or updated.

At step 504, process 500 can compute the hash of the proposed new vector. This hash computation can be done using any known hashing method that converts the proposed new vector into a shorter string or sequence of data.

At step 506, process 500 can compare the hash of the proposed new vector against hashes of vectors in a pool of vectors. If the hash of the proposed new vector does not match any hashes of vectors in the pool of vectors, process 500 can branch to step 508, where the process can create, store, and reference a new vector. If, however, the hash of the proposed new vector does match one or more hashes of vectors in the pool of vectors, process 500 can branch to step 510.

At step 510, process 500 can compare the proposed new vector against existing vectors in the vector pool. In some embodiments, only vectors that correspond to hashes that matched with the hash of the proposed new vector are compared to the proposed new vector. If no existing vectors in the vector pool match the proposed new vector, process 500 can branch to step 508, where the process creates and references a new vector. If, however, an existing vector is found that matches the proposed new vector, process 500 can branch to step 512, where the process inserts a reference to the existing vector rather than creating a new vector.

It can sometimes be desirable to group records in a database according to different "sets" of records. For instance, in the examples discussed above, records have all been grouped according to the key field OrderId, e.g., "SO-001", "SO-002", and "SO-003." However, it can also be desirable to group records according to other groups, such as part type, project ID, customer, manufacturing facility, geographic location, etc. Grouping records according to these other fields can give users of databases more flexibility in quickly accessing all records that pertain to a specific part type, to a specific project ID, or to a specific customer, etc.

Figure 6:
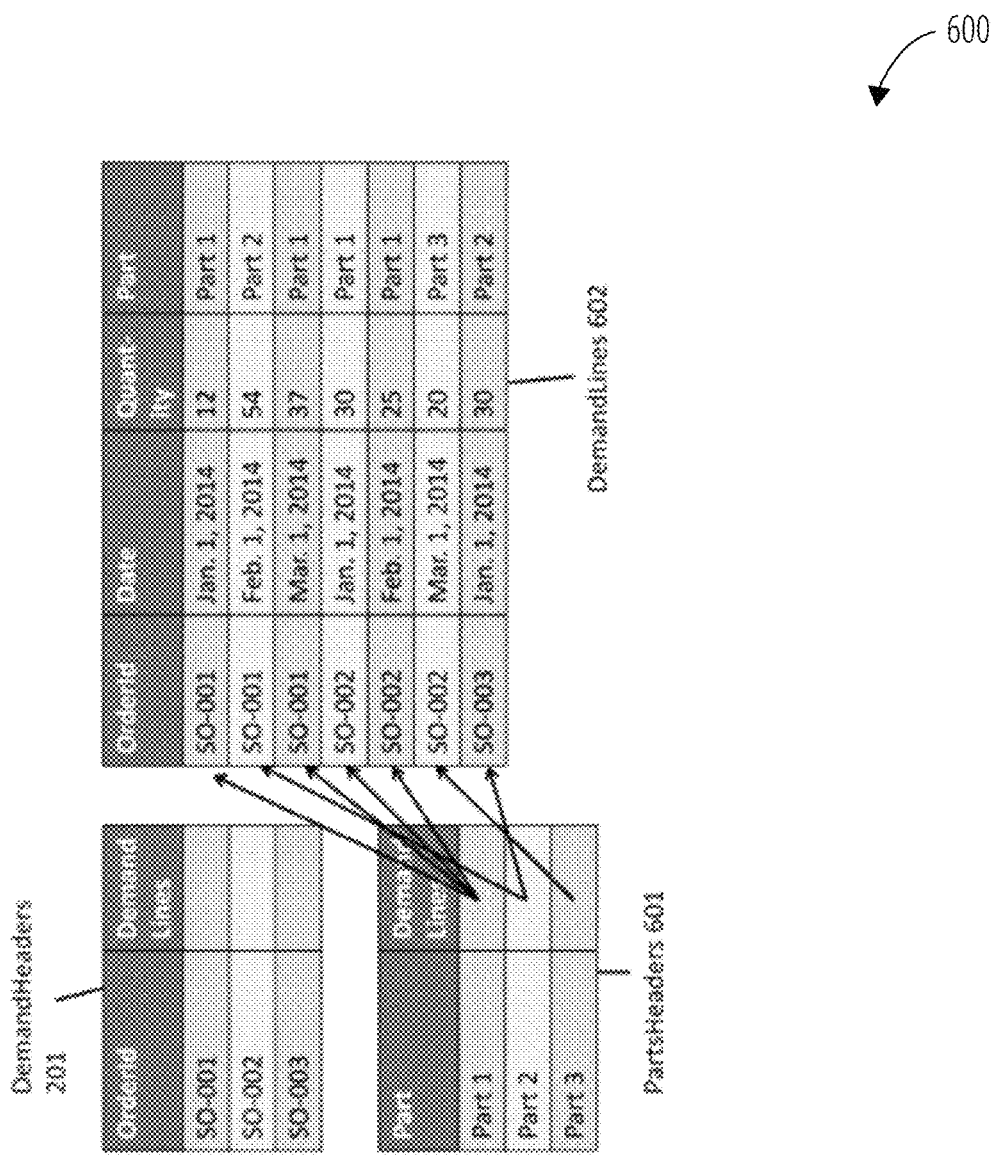
FIG. 6 shows an exemplary non-vector implementation of database records that illustrates how records can be grouped according to multiple groups, according to some embodiments.

FIG. 6 shows an exemplary non-vector implementation of database records that illustrates how records can be grouped according to multiple groups, according to some embodiments. This non-vector database can be implemented in database 114, disk 106, and/or memory 104. For ease of explanation, FIG. 6 builds upon the example dataset and data structures described with regards to FIG. 2. DemandLines table 602 can be similar to DemandLines table 202 in FIG. 2, except that DemandLines table 602 can also include a "Part" column. The "Part" column can store data associating each order with a specific part type, such as "Part 1", "Part 2", and "Part 3."

Similar to FIG. 2, FIG. 6 also contains a DemandHeaders table 201. Just as in FIG. 2, DemandHeaders table 201 can store associations between each OrderId (e.g., SO-001) and specific records (e.g., rows) in DemandLines table 602. FIG. 6 also contains a new PartsHeaders table 601. PartsHeaders table 601 can contain two columns: a Part column and a DemandLines column. The Part column in PartsHeaders table 601 can contain the same Parts stored in the Part column of DemandLines table 602, except that each Part can appear only once in PartsHeaders 601 (whereas they can appear multiple times in DemandLines 602). The DemandLines column in PartsHeaders table 601 can store references to specific records (e.g., rows) in DemandLines table 602 that are associated with those part types. For example, for the record in PartsHeaders table 601 corresponding to Part 1, the DemandLines column can contain four separate references to four separate records: (i) the record in DemandLines table 602 pertaining to the SO-001 order dated Jan. 1, 2014, with quantity "12"; (ii) the record in DemandLines table 602 pertaining to the SO-001 record dated Mar. 1, 2014, with quantity "37", (iii) the record in DemandLines table 602 pertaining to the SO-002 record dated Jan. 1, 2014, with quantity "30", and (iv) the record in DemandLines table 602 pertaining to the SO-002 record dated Feb. 1, 2014, with quantity "25." Similarly, the DemandLines column in PartsHeaders table 601 can also contain separate references pertaining to Part 2 and Part 3, as illustrated by further arrows linking PartsHeader 601 and DemandLines table 602.

In operation, DemandHeaders table 201, PartsHeaders table 601, and DemandLines table 602 can be used together to group records according to different groups. For example, if a user desires to search for all records pertaining to OrderId SO-001, the system can consult the record associated with SO-001 within DemandHeaders table 601 to determine the location of all records associated with SO-001. On the other hand, if a user desires to search for all records pertaining to Part 1, the system can consult the record associated with Part 1 within PartsHeaders table 601 to determine the location of all records associated with Part 1. Additional Header tables and associated fields can also be added to FIG. 6 to enable this database to group records according to other groups.

One potential disadvantage of non-vector databases is that each header table, e.g., DemandHeaders table 201 and/or PartsHeaders table 601 can be required to store many references to separate records for each group. In the example depicted in FIG. 6, the PartsHeaders table 601 must store four separate references to four records corresponding to Part 1, two separate references to two records corresponding to Part 2, and one reference to a record corresponding to Part 3. Referring back to FIG. 2, DemandHeaders table 201 must store three separate references corresponding to OrderId SO-001, three separate references corresponding to OrderId SO-002, and one reference corresponding to OrderId SO-003. Each separate reference can require a separate location in memory to store the association between that record and that part number or OrderId number. For databases that store a large number of records, storing and accessing record associations in this way can require a large amount of memory resources, as well as slow down database operations.

Figure 7:
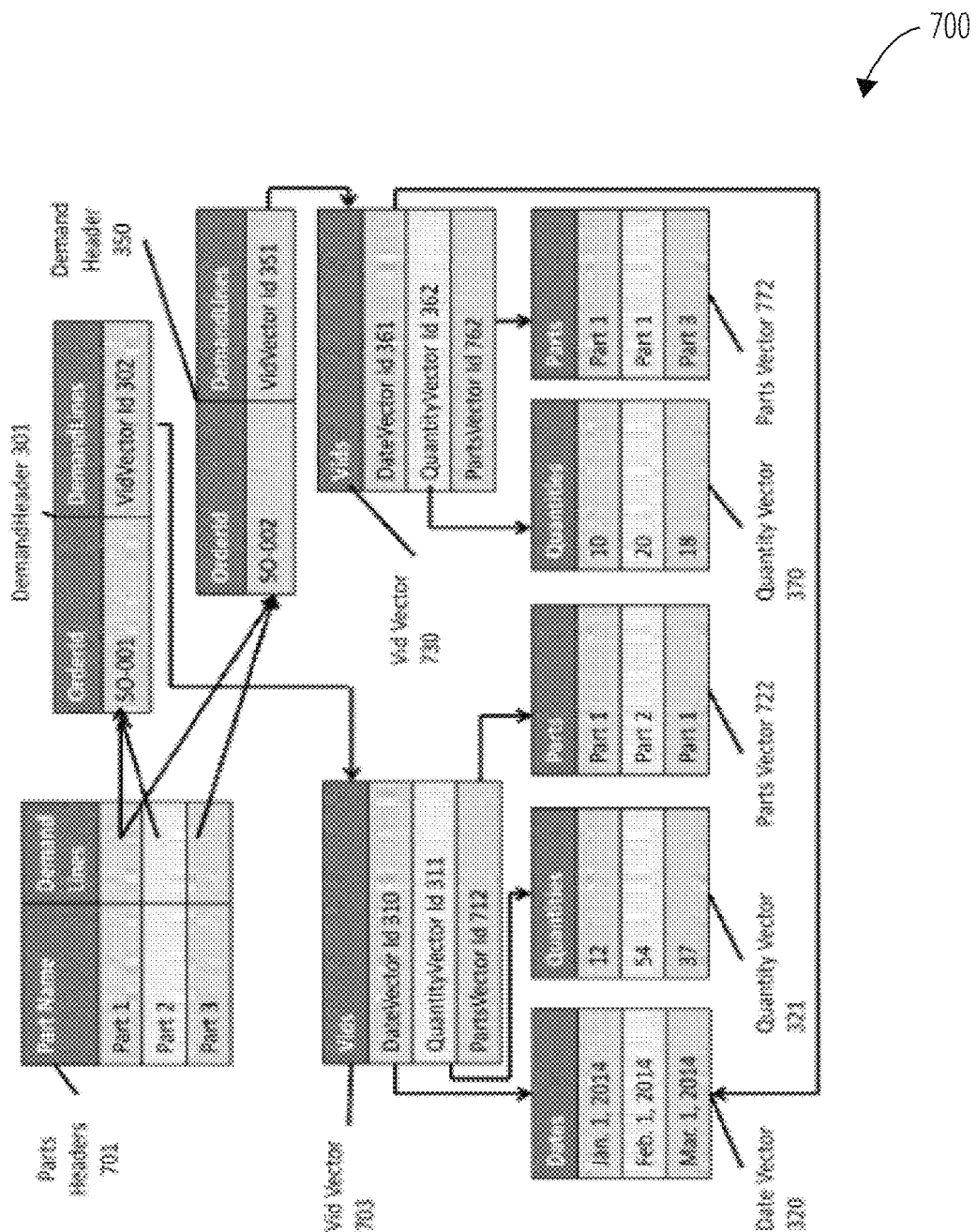
FIG. 7 shows an exemplary vector implementation of database records that illustrates how records can be grouped according to multiple groups, according to some embodiments.

FIG. 7 depicts an exemplary vector implementation of database records that illustrates how records can be grouped according to multiple groups, according to some embodiments. This vector-based database can be implemented at database 114, disk 106, and/or memory 104. For ease of explanation, FIG. 7 builds upon the example data set and data structures described with regards to FIG. 4. Just as in FIG. 4, FIG. 7 also includes DemandHeader table 301 that stores an association between OrderId SO-001 and VidVector Id 302, as well as DemandHeader table 350 that stores an association between OrderId SO-002 and VidVector Id 351. VidVector Id 302 stores a memory reference that points to Vid Vector 703, which is similar to Vid Vector 303 in that it stores memory references DateVector Id 310 and QuantityVector Id 311. The memory reference stored in DateVector Id 310 points, in turn to Date Vector 320, whereas the memory reference stored in QuantityVector Id 311 points to Quantity Vector 321. Similarly, VidVector Id 351 stores a memory reference that points to Vid Vector 730, which is similar to Vid Vector 330 in that it stores memory references DateVector Id 361 and QuantityVector Id 362. The memory reference stored in DateVector Id 361 points to Date Vector 320. As discussed above, Date Vector 320 can be associated with both OrderId's SO-001 and SO-002, thereby saving space. The memory reference stored in QuantityVectorId 362 points to Quantity Vector 370.

In FIG. 7, the exemplary data structures in FIG. 4 have been further extended to store part type information. Specifically, Vid Vector 703 includes an additional memory reference: PartsVector Id 712, whereas Vid Vector 730 includes PartsVector Id 762. PartsVector Id 712 can store a memory reference that points to Parts Vector 722, whereas PartsVector Id 762 can store a memory reference that points to Parts Vector 772.

Quantity Vector 321, Parts Vector 722, Quantity Vector 370, and Parts Vector 772 can all be sorted according to the order of dates stored in Date Vector 320. In operation, when a user desires to determine the part types of orders associated with a specific OrderId, such as SO-001, the system can first look up the appropriate DemandHeader table (e.g., DemandHeader table 301) to determine the Vid Vector associated with that OrderId (e.g., Vid Vector 703, which the system can navigate to by going to the memory location pointed to by VidVector Id 302). Once the system navigates to the appropriate Vid Vector (e.g., Vid Vector 703), the system can find the appropriate date, quantity and parts vectors (e.g., Date Vector 320, Quantity Vector 321, and Parts Vector 722). Since all vectors are sorted according to Date Vector 320, the system can determine that the order associated with "Jan. 1, 2014" is also associated with quantity "12" and "Part 1", that the order associated with "Feb. 1, 2014" is also associated with quantity "54" and "Part 2", and that the order associated with "Mar. 1, 2014" is also associated with quantity "37" and "Part 1". Sorting vectors according to a key field, such as date vector 320, can, under some circumstances, result in a higher rate of re-use for vectors corresponding to key fields. Also, sorting vectors according to a key field, such as date vector 320, can also facilitate comparison, updating, and merging of vectors, as further described below.

FIG. 7 also includes a PartsHeaders table 701. PartsHeaders table 701 can be similar to PartsHeaders table 601 in FIG. 6 in that it can also include a separate record (e.g., row) for each Part type (e.g., "Part 1", "Part 2", and "Part 3"). Instead of storing a reference to every individual DemandLine record that is associated with that Part type, however, PartsHeaders table 701 can store references to DemandHeader tables associated with Parts Vectors that include that Part type. For instance, PartsHeaders table 701 can store an association between Part 1 and two DemandHeader tables: DemandHeader table 301 and DemandHeader table 350. This is because DemandHeader table 301 is associated with Parts Vector 722, which includes "Part 1" (as well as other Part types), and because DemandHeader table 350 is associated with Parts Vector 772, which also includes "Part 1" (as well as other Part types). Similarly, PartsHeaders table 701 can store an association between Part 2 and DemandHeader table 301. This is because DemandHeader table 301 is associated with Parts Vector 722, which includes Part 2. In some embodiments, PartsHeader table 701 would not store an association between Part 2 and DemandHeader table 350, since DemandHeader table 350 is not associated with a Parts vector that includes Part 2. Similarly, in some embodiments, PartsHeader table 701 would store an association between Part 3 and DemandHeader table 350, but not an association between Part 3 and DemandHeader table 301.

In operation, PartsHeaders table 701 can be used together with the other data structures depicted in FIG. 7 to group records according to different groups. For example, if a user desires to search for all records pertaining to OrderId SO-001, the system can consult DemandHeader table 301 according to the procedure described above. On the other hand, if the user desires to search for all records pertaining to Part 1, the system can consult the record associated with Part 1 within PartsHeaders table 701. From there, the system can determine that the DemandHeader tables associated with OrderId SO-001 and SO-002 (i.e., DemandHeader table 301 and DemandHeader table 350) are associated with parts vectors that contain "Part 1". By tracing through the appropriate memory references, the system can traverse Parts Vector 722 and Parts Vector 772 and select only those records within those vectors that have a value corresponding to "Part 1." This comparison can involve a simple comparison between two data values, and so can be very fast. Once the records that have values corresponding to "Part 1" have been selected (e.g., the first and the third element in Parts Vector 722), the system can also retrieve corresponding records from Date Vector 320 and Quantity Vector 321.

The vector-based implementation described in FIG. 7 can save space relative to the non-vector-based implementation described in FIG. 6. This can be seen in the smaller number of references that must be stored in PartsHeaders table 701 relative to PartsHeaders table 601. For example, PartsHeaders table 601 stores four references for Part 1, whereas PartsHeaders table 701 stores only two references for Part 1. In database implementations using long vectors (e.g., vectors with dozens, hundreds, thousands, millions, or even more elements), this space savings can become considerable. Database performance can also be improved in vector-based implementations because retrieving groups of records can require fewer memory-accesses. The reduction in memory-access can be due to the densely-compacted nature of the vectors, in comparison with the non-vector use of points and a container.

Another benefit of vector-based implementations (e.g., databases that use vector-based tables) is that the header tables can absorb the responsibility for overhead that would otherwise be on each record in a set. Vector-based implementations can therefore avoid consuming space to store values that are generally required to support different features, such as maintaining different versions of the same data.

Figure 8:
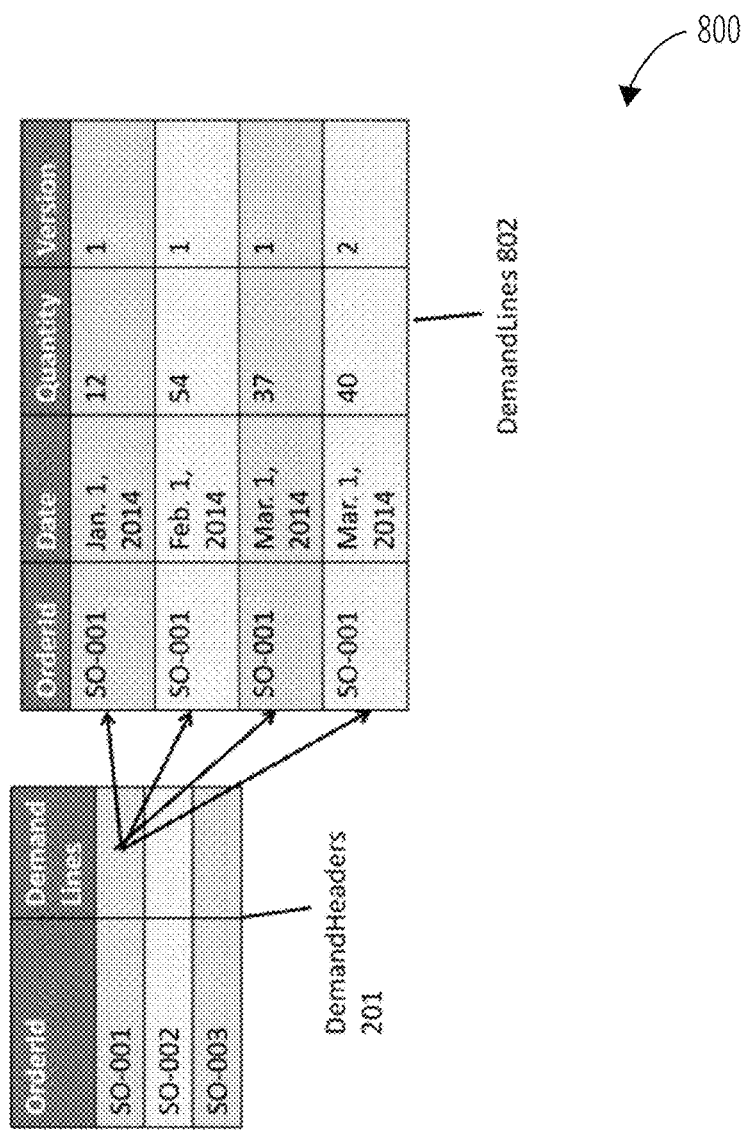
FIG. 8 shows an exemplary non-vector implementation of database records that supports a versioning feature, according to some embodiments.

FIG. 8 depicts an exemplary non-vector implementation of database records that supports a versioning feature, according to some embodiments. This non-vector database can be implemented at database 114, disk 106, and/or memory 104. For ease of explanation, FIG. 8 builds upon the example data set and data structures described with regards to FIG. 2. Just as in FIG. 2, FIG. 8 also includes DemandHeaders table 201 that stores associations between different OrderId's and specific records. FIG. 8 also includes DemandLines table 802. DemandLines table 802 is the same as DemandLines table 202 in FIG. 2 except that records pertaining to OrderId's other than SO-001 have not been shown, and an additional column labeled "Version" has been added. This additional "Version" column can store a version number associated with each record. The first three records (e.g., rows) in DemandLines table 802 corresponds to the first three rows of DemandLines table 202. Assume that a user then changes the order associated with "Mar. 1, 2014" to have a quantity of "40" instead of "37." To capture this change in a new version, the system can add a new record (e.g., row) to DemandLines table 802 that is identical to the previous "Mar. 1, 2014" record except that the quantity has been revised from "37" to "40", and its version number has been incremented from "1" to "2". This newly created record is depicted as the fourth record (e.g., row) in DemandLines table 802. DemandHeaders table 201 is then updated to store a new association between OrderId SO-001 and the newly created fourth record, which is depicted as an arrow linking DemandHeaders table 201 with the newly created fourth record in DemandLines table 802. In this implementation, every version update can result in a new record being added to DemandLines table 802, and a new reference being stored in DemandHeaders table 201 linking the appropriate OrderId with the new record.

Figure 9:
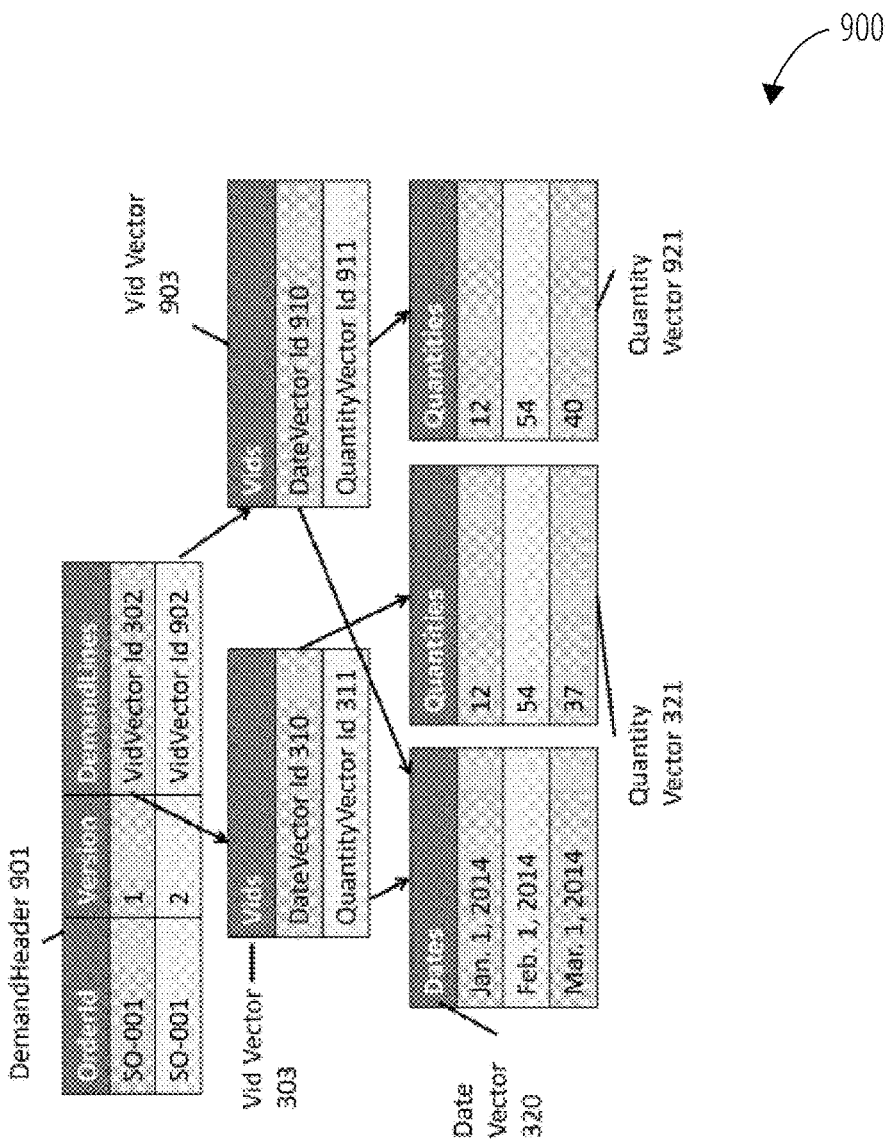
FIG. 9 shows an exemplary vector implementation of database records that supports a versioning feature, according to some embodiments.

FIG. 9 depicts an exemplary vector implementation of database records that supports a versioning feature, according to some embodiments. This vector-based database can also be implemented in database 114, disk 106 and/or memory 104. For ease of explanation, FIG. 9 builds upon the example data set and data structures described with regards to FIG. 3. Just as in FIG. 3, FIG. 9 also includes Vid Vector 303, which contains a Date Vector Id 310 that references a Date Vector 320, as well as a QuantityVector Id 311 that references a quantity vector 321. FIG. 9 also includes a DemandHeader table 901. DemandHeader table 901 is similar to DemandHeader table 301 in FIG. 3 except that it has been extended to include a new "Version" column. This "version" column keeps track of version numbers associated with different Vid Vectors.

In general, when one or more values associated with a record is updated, a new data vector is created that reflects the change. In addition, a new Vid vector is created that references the newly created data vector. Then, a new record (e.g., row) is added to the appropriate header table that references the newly created Vid vector, and associates that newly created Vid vector with an incremented version number.

An example of this operation is depicted in FIG. 9. Consider again the case where the record associated with "Mar. 1, 2014" is updated from a quantity of "37" to "40." The system can create a new vector, e.g., Quantity Vector 921. Quantity Vector 921 can be a duplicate of Quantity Vector 321 except that the last record is changed from "37" to "40" to reflect the change. Then, a new Vid Vector 903 is created. Vid Vector 903 can have the same structure as Vid Vector 303 in that it can also contain a reference to a Date Vector (e.g., DateVector Id 910) and a reference to a Quantity Vector (e.g., QuantityVector Id 911). Since the update of the "Mar. 1, 2014" order from "37" to "40" does not involve a change to any dates, DateVector Id 910 of Vid Vector 903 can refer to the same Date Vector 320 as Vid Vector 303. However, since the update does involve a change to a Quantity Vector, QuantityVector Id 911 can refer to the newly created Quantity Vector 921. After Vid Vector 903 has been created and stored, DemandHeader table 901 can be updated to include an additional record (e.g., row). This new row can also refer to OrderId SO-001 but have its version number incremented from "1" to "2". This new record can also contain a memory reference to Vid Vector 903 in its DemandLines column, e.g., at VidVector Id 902.

In operation, when a user wishes to retrieve the latest version of all orders associated with OrderId SO-001, the system can consult DemandHeader table 901 and determine that the record with the highest version number is the second record, having version number "2". The system can then follow VidVector Id 902 to navigate to Vid Vector 903. At Vid Vector 903, the system can then navigate to Date Vector 320 and Quantity Vector 921, which corresponds to the latest records associated with OrderId SO-001. If, on the other hand, the user wishes to retrieve version 1 of orders associated with OrderId SO-001, the system can consult DemandHeader table 901 and determine that VidVector 303 (as stored in VidVector Id 302) corresponds to version 1. By navigating to Vid Vector 303, the system can determine that Date Vector 320 and Quantity Vector 321 is associated with version 1 of orders associated with OrderId SO-001.

Certain embodiments of vector-based implementations can also support updating and merging of vectors. Updating and merging of vectors can be advantageous when a database maintained by a central server, or portions of said database, can be checked out and edited offline by multiple users simultaneously, or can be edited by multiple users at once. When these users check in their offline versions of the database back into the central server, or when these users finish their simultaneous edits, updating and merging of multiple vectors can comprise reconciling conflicts and updates between different versions.

Figure 10:
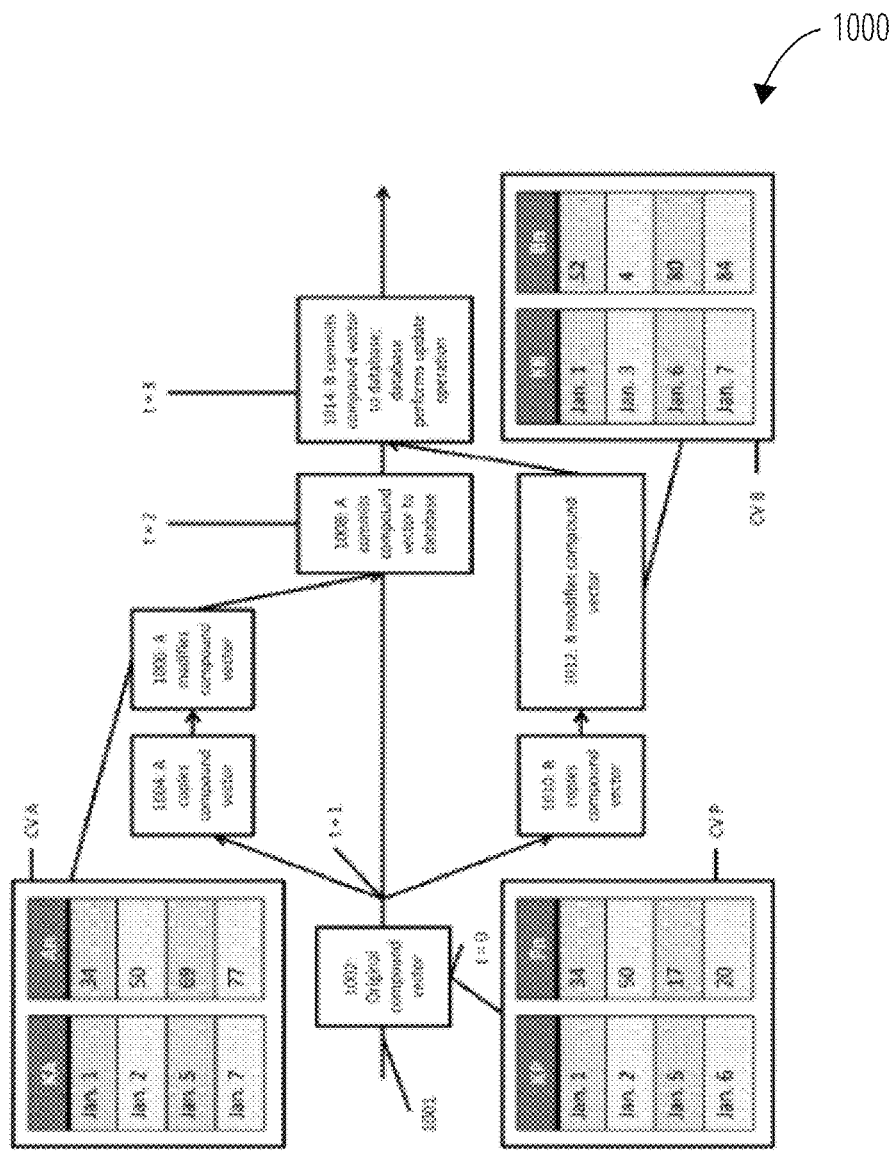
FIG. 10 depicts an exemplary scenario where multiple versions of a database, or portions thereof, can be merged with one another, according to some embodiments.

FIG. 10 depicts an exemplary scenario where multiple versions of a database, or portions thereof, can be compared, updated, and/or merged with one another. FIG. 10 includes a timeline 1001 which shows the progression of time from left to right. At step 1002, which corresponds to time value t=0, a central database maintains a version CV P of a compound vector. A "compound vector", or "CV", can be a combination of two or more vectors, in which one vector can be considered a "key" vector that determines the sort order of the other vectors. A "compound vector" can also refer to a set of records represented by a VidVector, such as VidVector 703 in FIG. 7. In this example, compound vector CV P comprises two vectors: a key vector "KP" that lists an ascending series of dates (e.g., "Jan. 1", "Jan. 2", "Jan. 5", and "Jan. 6"), and a data vector "Pn" whose contents are sorted according to the sequence of dates stored in KP. While compound vector CV P is depicted as including two vectors, additional data vectors can also be included, wherein each data vector is sorted according to the sequence in KP.

At time t=1, two things can occur. At step 1004: a first user A can copy the out the compound vector CV P to create a local version specific to A. At step 1010: a second user "B"

also copies the compound vector P to create a local version specific to B. In some embodiments, this copying operation can be referred to as creating a new scenario. At this point, three versions, or "scenarios", of compound vector CV P exist: one maintained in a central database, one in the possession of A, and one in the possession of B.

At step 1006, the first user can modify the compound vector CV P in her possession to create compound vector CV A.

At step 1008, which corresponds to time value t=2, user A can commit compound vector CV A back into the central database. "Committing" a database, or a portion of a database (such as a compound vector), can refer to saving changes made to a first version of a database into a second version of the database, thereby combining the two versions of the database in a way that preserves changes made later in time. Since CV A contains changes made later in time than any changes made to CV P, the commit operation at step 1008 can simply comprise saving the changes that A had made to CV A into the central database as a new version that takes precedence over the previously existing CV P.

At step 1012, the second user can modify the compound vector CV P in his possession to create compound vector CV B.

At step 1014, which corresponds to time value t=3 (e.g., later in time compared to time value t=2), user B can commit compound vector CV B back into the central database. At this point, the system can merge compound vector CV B, which contains edits to CV P, with CV A, which is currently stored in the central database.

This merge operation can, in some embodiments, be implemented by comparing three different compound vectors: CV A (the version saved in the central database at time t=2), CV B (the version being checked-in by user B at time t=3), and CV P (the last common ancestor of CV A and CV B). The merge operation can proceed by comparing each element of KP, KA, and KB in sequence.

Figures 11A, 11B:
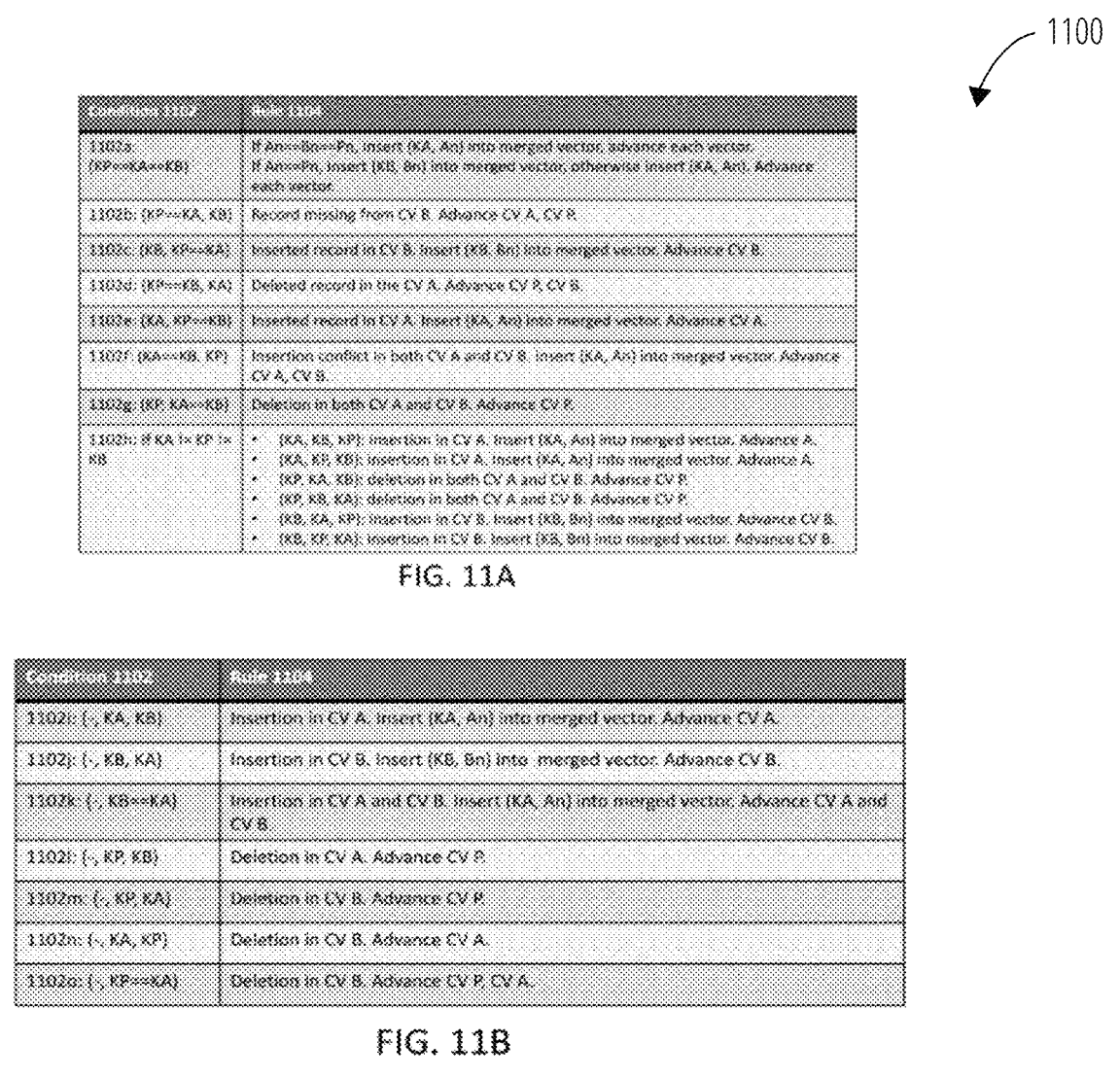

FIGS. 11A and 11B list an exemplary set of rules that can be used to implement this merge operation. Condition column 1102 lists a series of conditions, where each condition is listed with the smallest number first. So, for instance, Rule 1102*a* can apply when KP equals KA and KB. Rule 1102*b* can apply when KP equals KA, and both are smaller than KB. Rule 1102*c* can apply when KP equals KA, and both are greater than KB. Rule 1102*d* can apply when KP=KB, and both are less than KA, etc. Rules 1102*i* through 1102*p* apply when CV A, CV B and CV P are of unequal length, such that one vector runs out before the other two vectors run out. In those cases, a "-" symbol is used to signify that one vector has run out.

Rule column 1104 lists the appropriate action to take in the event of each condition. References to inserting various element pairs (e.g., (KA, An) or (KB, Bn)) into a merged vector refers to adding an element to a new merged compound vector, such as CV M, having key vector KM and data vector Mn. References to "advancing" a vector refers to moving to the next element in that vector.

FIGS. 12A-F depict an example of how the rules listed in FIGS. 11A-B can be applied to compound vectors CV P, CV A, and CV B in FIG. 10. Recall that in this illustrative example, CV P is the original version of the compound vector, CV A is the compound vector that user A had first committed back to the database, and CV B is the compound vector that user B had subsequently committed back to the database, and which now needs to be merged. At FIG. 12A, the merge operation begins by comparing the first records in CV P, CV A, and CV B. The current records being compared in each compound vector CV P, CV A, and CV B are highlighted using bolded black boxes. As can be seen, the first record (KP, Pn) in CV P is ("Jan. 1", 34), the first record (KA, An) in CV A is ("Jan. 1", 34), and the first record (KB, Bn) in CV B is ("Jan. 1", 52). Since KP==KA==KB=="Jan. 1", rule 1102*a* applies. Since An and Pn are equal to one another (i.e., they are both 34) but are not equal to Bn (i.e., 52), rule 1102*a* specifies to insert (KB, Bn) into the merged vector. This can be seen by the addition of ("Jan. 1", 52) into merged vector CV M, on the right. Rule 1102*a* also specifies that in this situation, the system can "advance each vector." This is denoted by the downward arrows attached to the bottom of each bolded black box.

FIG. 12B illustrates the next step of the merge operation. The system now compares the second record of each compound vector. The second record (KP, Pn) in CV P is ("Jan. 2", 50), the second record (KA, An) in CV A is ("Jan. 2", 50), and the second record (KB, Bn) in CV B is ("Jan. 3", 4). Since KP is equal to KA (i.e., they are both "Jan. 2"), and both are less than KB ("Jan. 3"), rule 1102*b* applies. In this case, the system can determine that a record is missing from CV B. Nothing gets added to compound vector CV M, and CV A and CV P are advanced, meaning that the system moves on to consider the next element in each vector. The advancement of CV A and CV P is denoted by the downward arrows at the bottom of the black boxes on CV P and CV A.

FIG. 12C illustrates the next step of the merge operation. The system now compares the third records of compound vectors CV P and CV A with the second record of CV B. The third record (KP, Pn) in CV P is ("Jan. 5", 17), the third record (KA, An) in CV A is ("Jan. 5, 69), and the second record (KB, Bn) in CV B is ("Jan. 3", 4). Since KP is equal to KA (i.e., they are both "Jan. 5"), and both are greater than KB (i.e., "Jan. 3"), rule 1202*c* applies. In this case, the system can determine to insert (KB, Bn) into the merged vector CV M. This can be seen by the addition of ("Jan. 3", 4) into merged vector CV M, on the right. Rule 1102*c* also specifies that in this situation, the system can advance CV B. This is denoted by the downward arrow at the bottom of the black box on CV B.

FIG. 12D illustrates the next step of the merge operation. The system now compares the third records of compound vectors CV P, CV A, and CV B. The third record (KP, Pn) in CV P is ("Jan. 5", 17), the third record (KA, An) in CV A is ("Jan. 5, 69), and the third record (KB, Bn) in CV B is ("Jan. 6", 80). Since KP is equal to KA (i.e., they are both "Jan. 5"), and both are smaller than KB (i.e., "Jan. 6"), rule 1102*b* applies. Nothing gets added to compound vector CV M, and CV A and CV P are advanced. This can be because although the record associated with Jan. 5 had previously existed in CV P and CV A, user B had subsequently deleted that record, and so it is not saved in the merged vector. The advancement of CV A and CV P is denoted by the downward arrows at the bottom of the black boxes on CV P and CV A.

FIG. 12E illustrates the next step of the merge operation. The system now compares the fourth records of compound vectors CV P and CV A, and the third record of CV B. The fourth record (KP, Pn) in CV P is ("Jan. 6", 20), the fourth record (KA, An) in CV A is ("Jan. 7", 77), and the third record (KB, Bn) in CV B is ("Jan. 6", 80). Since KP is equal to KB (i.e., they are both "Jan. 6") and both are smaller than KA ("Jan. 7"), rule 1102*d* applies. Nothing gets added to the compound vector CV M, and CV P and CV B are advanced. This can be because although user B had included a record for "Jan. 6", user A had deleted that record, and so the merged vector does not include a record for "Jan. 6". This is denoted by the downward arrow at the bottom of the black boxes on CV P and CV B.

FIG. 12F illustrates the next step of the merge operation. Since CV P has no more records left to compare, the system now compares the fourth records of CV A and CV B. The fourth record (KA, An) of CV A is ("Jan. 7", 77), while the fourth record (KB, Bn) of CV B is ("Jan. 7", 84). Since KA is equal to KB, rule 1102k applies. In this case, the system inserts (KA, An) into merged vector CV M. This can be seen by the addition of ("Jan. 7", 77) into merged vector CV M, on the right. Rule 1102k also specifies that in this situation, the system can advance CV A and CV B. This is denoted by the downward arrow at the bottom of the black boxes on CV A and CV B.

Since CV A and CV B have no more records, the merge operation can end at this point. The resulting merged vector CV M now has three records: ("Jan. 1", 52), ("Jan. 3", 4), and ("Jan. 7", 84). This merged vector CV M can be saved into the central database at time t=3.

While the above figures and description have been focused on a database of parts orders, the non-vector and vector-based implementations of databases can be adapted and generalized to any arbitrary database. Any database that organizes data according to a plurality of records, each record having one or more fields, and which optionally supports grouping and versioning features can be implemented according to both the non-vector and vector-based implementations described above. Non-limiting examples of databases that can be implemented using one or both approaches can include databases recording sales activities and/or forecasts, manufacturing activities and/or forecasts, inventory levels, weather patterns and/or observations, student and/or employee performance indicators, cargo tracking and/or planning data, astrometric data, computational resources, consumer spending habits and patterns, macro-economic data, etc. Instead of using dates as a key field for determining sort orders in compound vectors, any arbitrary field can serve as a key field. Non-limiting examples of fields that can be used as a key field include customer name, ship-to location, customer contact, project type, project name, product type, etc. Instead of using OrderId to organize records, any arbitrary field can be used as a key label to organize records, including all of the aforementioned fields. In no way should the aforementioned examples limit the scope of the invention, as they are only exemplary embodiments of vector and non-vector-based implementations of databases.

In some embodiments, databases can combine both vector and non-vector-based approaches. For example, databases can store a database in non-volatile memory using a non-vector-based implementation, and then convert the non-vector database into a vector-based implementation when loading the database, or a portion thereof, into volatile memory upon startup (or vice-versa). In some embodiments, databases can store certain types of data using a non-vector-based implementation, and other types of data using a vector-based approach. This can exploit the fact that certain types of data exhibit higher degrees of repeatability or predictability than other types of data, thereby making them more amenable to vector-based implementations. In some cases, databases can be configured to convert between vector-based and non-vector-based implementations depending on expected or observed characteristics of datasets, such as the dataset's predictability, periodicity, and/or entropy.

The features described can be combined in other ways as well. For example, each of the vector re-use feature described in relation to FIGS. 4-5, the grouping feature described in relation to FIG. 7, the versioning feature described in relation to FIG. 9, and the merge and update feature described in relation to FIGS. 10-12F are optional features and are not necessary to the described embodiments. However, any or all of these features can also be combined in any database implemented using vector-based tables. While the figures above describe each feature in isolation, this is for ease of explanation only, and does not preclude combinations of these features in the same database.

Figure 13:
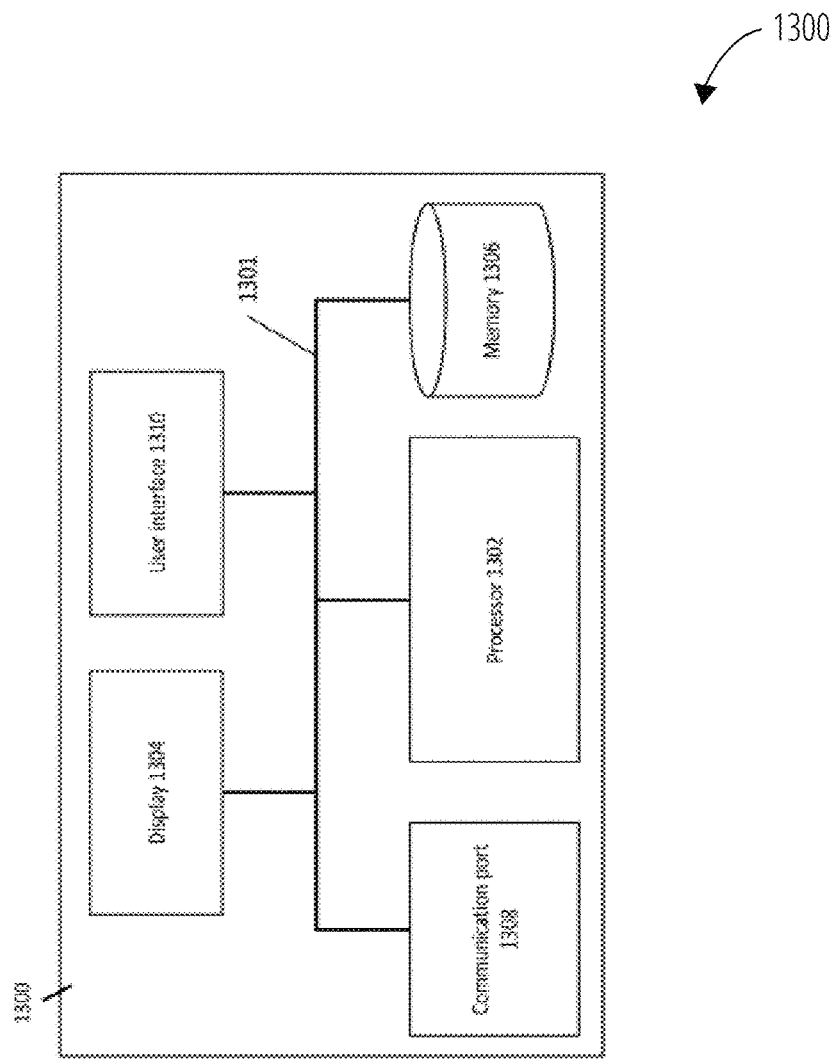
FIG. 13 depicts an example of a computer system with which embodiments of the present invention can be implemented.

FIG. 13 depicts an example of a computer system 1300 with which embodiments of the present invention can be implemented. Client devices 108a, 108b, and/or data server 102 can be implemented according to parts or all of the computer system 1300. According to the present example, the computer system can include a bus 1301, at least one processor 1302, at least one communication port 1308, a memory 1306, a display 1304, and a user interface 1310.

Processor(s) 1302 can include any known processor, such as but not limited to, an Intel® Itanium® or Itanium 2® processor(s), AMD® Opteron® or Athlon MP® processor(s), Motorola® lines of processors, Apple® A7®, A8®, A9® lines of processors, or Qualcomm® lines of processors. Communication port(s) 1308 can be any communication interface used for communicating with another device, such as an RS-232 port for use with a modem based dial-up connection, a 10/100 Ethernet port, a Bluetooth® or WiFi interface, a Gigabit port using copper or fiber, or a 3GPP, LTE, or other wireless cellular network-based interface. Communication port(s) 1308 can enable computer system 1300 to communicate over a network such as a Local Area Network (LAN), Wide Area Network (WAN), or any network to which computer system 1300 connects. Memory 1306 can comprise Random Access Memory (RAM) or any other dynamic storage device(s) commonly known to one of ordinary skill in the art. Memory can also comprise Read Only Memory (ROM) that can include any static storage device(s) such as Programmable Read Only Memory (PROM) chips for storing static information such as instructions for processor 1302, for example. Furthermore, memory 1306 can also comprise mass storage memory for storing information and instructions. For example, hard disks such as the Adaptec® family of SCSI drives, an optical disc, an array of disks such as RAID (e.g., the Adaptec family of RAID drives), or any other mass storage devices may be used. Bus 1301 can be a PCI/PCI-X or SCSI based system bus depending on the storage devices used, for example.

Display 1304 can include any known device for displaying data in a visual format, including screens or displays integrated into computer system 1300, as well as screens, displays or monitors that communicate but are not integrated with computer system 1300. User-interface 1310 can include any known device for receiving user input, including keyboards, microphones, optical or trackball mouse, joysticks, trackballs, gesture recognition devices, etc. In some embodiments, user-interface 1310 can be integrated with display 1304, as in the case of a responsive touchscreen. In other embodiments, user-interface 1310 can be a separate device that is integrated with computer system 1300 (e.g., a built-in physical keyboard, as in the case of a laptop) or that communicate but are not integrated with computer system 1300. The components described are meant to exemplify some types of possibilities. In no way should the aforementioned examples limit the scope of the invention, as they are only exemplary embodiments of computer system 1300 and related components.

Figure 14:
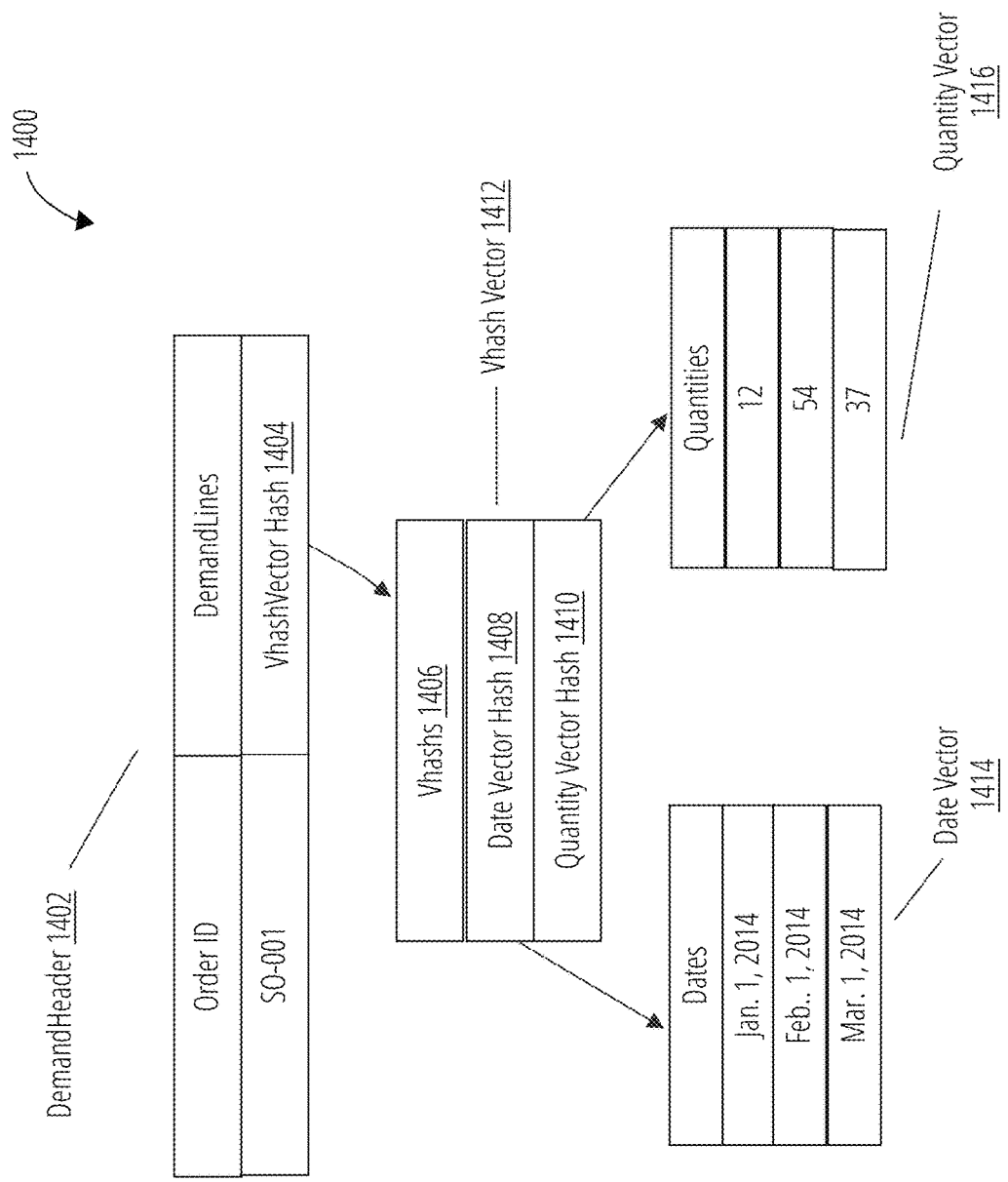
FIG. 14 shows an exemplary vector implementation of database records, according to some embodiments.

FIG. 14 shows an exemplary vector implementation of database records, according to some embodiments. The vector implementation of a database can also be implemented at database 114, disk 106, and/or memory 104 shown in FIG. 1. FIG. 14 differs from FIG. 3 in the following way. The VIDs that are used to identify the vectors in FIG. 3, are arbitrary, in that there is no connection between the contents of a vector and its VID. This is why, for example, when a new vector is introduced into the system, VIDs are not used to identify the new vector, nor the vectors already in memory. Instead, as illustrated in FIG. 5, hashes of vectors are computed and compared, since the hash of a vector provides some information about the content of the vector. The 4-byte hash, however, is not necessarily unique, thereby requiring an element-by-element comparison of two vectors with an identical 4-byte hash.

In some embodiments, rather than assign an abstract identifier (VID) to a vector, a unique identifier can be derived based on the ordered elements of the vector. Such a unique identifier can be a content-based hash, such that the hash has an infinitesimal chance of collision for two different vectors. This identifier, a vector hash (or "Vhash") can be a cryptographic hash. In some embodiments, the Vhash can be at least 16 bytes; or can have a size of 20 bytes. The cryptographic hash of each vector can be represented in hexadecimal form.

In FIG. 14, instead of using arbitrary VIDs to identify vectors, each vector is uniquely identified by its cryptographic hash (i.e. "Vhash"). FIG. 14 includes one table, i.e., DemandHeader table 102, as well as a plurality of vectors, i.e., "Vhash" Vector 1412, Date Vector 1414, and Quantity Vector 1416.

In parallel with FIG. 3, DemandHeader table 1402 can also include two columns: an OrderId column and a DemandLines column. The OrderId column can contain OrderId's, such as SO-001. However, instead of storing a plurality of memory references, wherein each reference relates to a separate record in another table, the DemandLines column can store, for each record (e.g., row), a memory reference that points to a vector. For instance, the DemandLines column can store a memory reference, denoted as Vhash Vector Hash 1404. The "memory reference" can be an identifier that uniquely identifies a location in database memory.

In the depicted example, DemandHeader table 1402 stores an association between OrderId SO-001 and memory reference Vhash Vector Hash 1404. Vhash Vector Hash 1404 points to Vhash Vector 1412. Vhash Vector 1412 can be a vector having two elements. The first element can be a DateVector hash 1408, which can contain a memory reference to a Date Vector 1414, while the second element can be a QuantityVector hash 1410, which can contain a memory reference to a Quantity Vector 1416. Vhash Vector 1412 can therefore be considered a "Vector Hash" Vector (e.g., "vhash" vector) because it is a vector that stores memory references to other vectors. In the depicted example, Date Vector 1414 can in turn be a vector with three elements storing three dates: "Jan. 1, 2014", "Feb. 1, 2014", and "Mar. 1, 2014." Quantity Vector 1416 can also be a vector with three elements storing three quantities: "12", "54" and "37." Date Vector 1414 and Quantity Vector 1416 can therefore be considered data vectors, as each sequence in the vector contains a data payload.

Although not shown in FIG. 14, a vector-based database can also contain DemandHeader tables for OrderId's SO-002 and SO-003. Each DemandHeader Table for SO-002 and SO-003 can contain Vhash Vector Hash's to other Vhash Vectors similar to Vhash Vector 1412. Each Vhash Vector can also contain DateVector hash's and Quantity Vector hash's similar to DateVector Hash 1408 and QuantityVector Hash 1410, respectively. Each DateVector Hash and Quantity Vector Hash can also point to Date Vectors and Quantity Vectors similar to Date Vector 1414 and Quantity Vector 1416, respectively.

In operation, DemandHeader table 1402, Vhash Vector 1412, Date Vector 1414 and Quantity Vector 1416 can be used together to look up specific orders related to different OrderId's. For example, if a user desires to search for all records pertaining to OrderId SO-001, the system can first look up DemandHeader table 1402 to determine the Vhash Vector 1412 associated with SO-001. Once the system reads the memory reference located at Vhash Vector Hash 1404, the system can navigate to Vhash Vector 1412. At Vhash Vector 1412, the system can read the memory references stored at DateVector hash 1408 and QuantityVector Hash 1410, and using those references, navigate to Date Vector 1414 and Quantity Vector 1416. By reading the contents of Date Vector 1414, the system can determine all the dates associated with orders having OrderId SO-001. Similarly, by reading the contents of Quantity Vector 1416, the system can determine all the quantities associated with orders having OrderId SO-001. Furthermore, the elements of Quantity Vector 1416 can be sorted according to the dates contained in Date Vector 1414, such that the system can further determine that the quantity "12" is associated with the order associated with "Jan. 1, 2014", the quantity "54" is associated with the order associated with "Feb. 1, 2014", and the quantity "37" is associated with the order associated with "Mar. 1, 2014."

While there is a theoretically infinitesimal probability for two different vectors to generate the same cryptographic hash, for all intents and purposes, that probability is zero. That is, two vectors that generate an identical cryptographic hash are identical; their contents do not need to be checked. This provides an improvement with regards to indexing of vectors (and persistence of the vectors onto non-volatile storage) and also provides an improvement for vector pooling.

Figure 15:
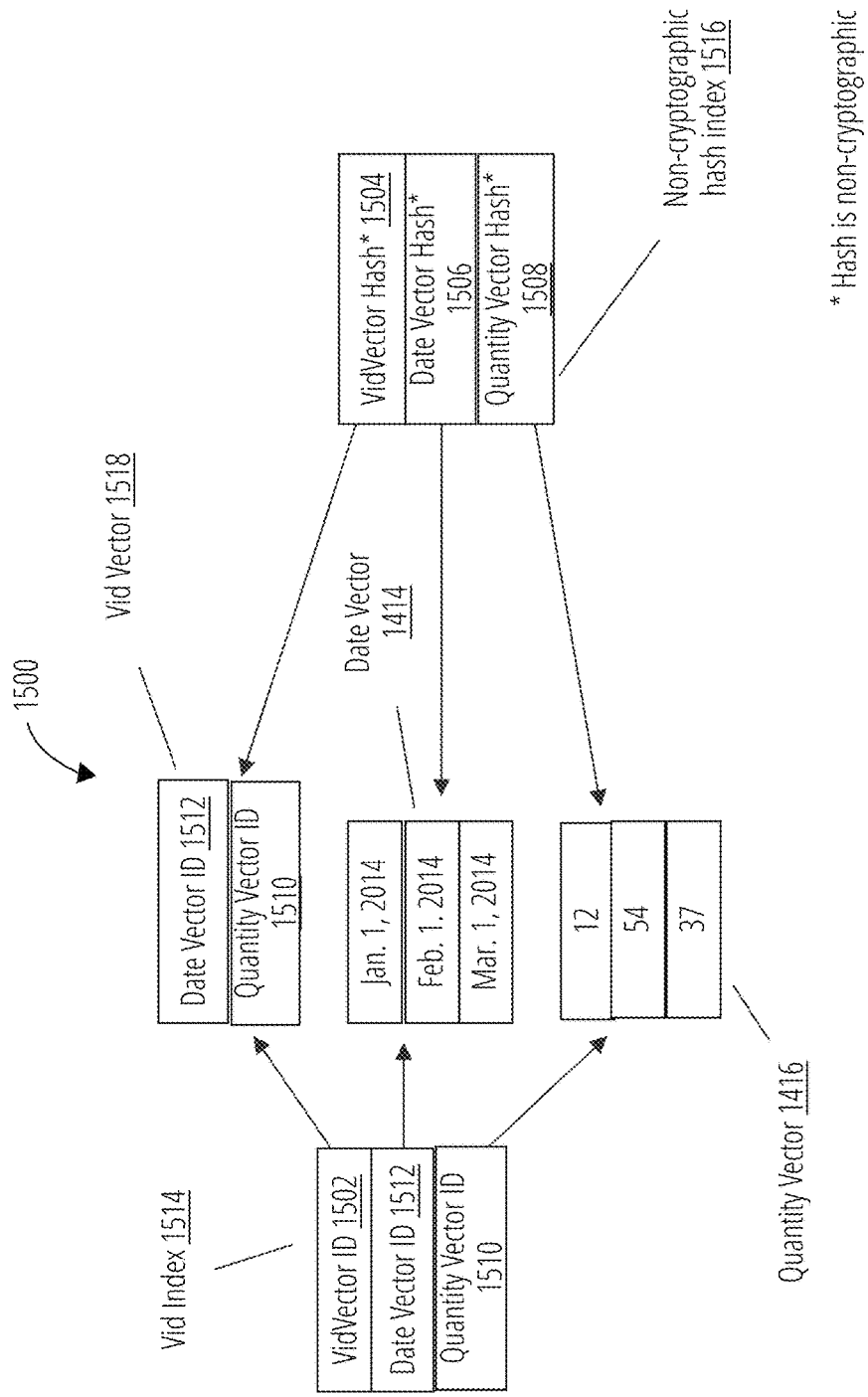
FIG. 15 depicts an exemplary indexing of data shown in FIG. 3, according to some embodiments.

FIG. 15 depicts an exemplary in-memory indexing 1500 of the data shown in FIG. 3, in some embodiments. Each hash in FIG. 15 is a non-cryptographic 4-byte hash. Each vector shown in FIG. 3 (i.e. Vid Vector, Date Vector and Quantity Vector) is associated with two indices: a Vid Index 1514 and non-cryptographic hash index 1518. That is, Date Vector 1414 is indexed by Date Vector ID 1512 and Date Vector Hash 1506; Quantity Vector 1416 is indexed by Quantity Vector ID 1510 and Quantity Vector Hash 1508, and Vid Vector 1520 is indexed by Vid Vector ID 1502 and Vid Vector Hash 1504. The exemplary indexing 1500 can also be used when persisting data to non-volatile storage, in some embodiments.

Figure 16:
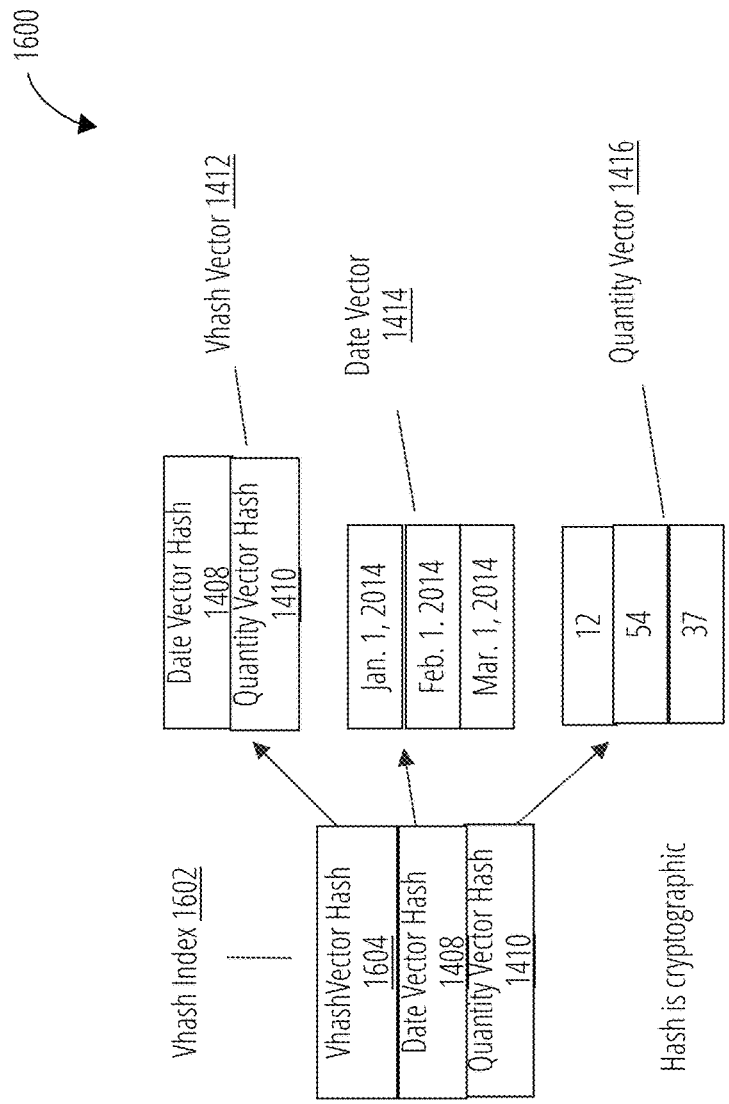
FIG. 16 depicts an exemplary indexing of data shown in FIG. 14, according to some embodiments.

FIG. 16 depicts an exemplary indexing 1600 of the data vectors shown in FIG. 1. Each hash in FIG. 16 is a cryptographic hash. Each vector shown in FIG. 14 (i.e. Vhash Vector, Date Vector and Quantity Vector) is associated with one index: a Vhash Index 1602. That is, Date Vector 1414 is indexed only by Date Vector Hash 1408; Quantity Vector 1416 is indexed only by Quantity Vector Hash 1410; and Vhash Vector 1412 is indexed only by Vhash Vector Hash 1404. Unlike the indexing shown in FIG.

15, there is no need for a separate VID index. The exemplary indexing 1600 can also be used when persisting data to non-volatile storage, in some embodiments.

In the vector pool, where VIDs are used to identify vectors, vectors can be looked up by their unique VID, or matched by their hash and contents. The latter procedure is used during data creation and change operations, where a target working vector is constructed and then compared to other vectors already in the pool by hash and content to see if it exists or not. If there is a match, then the working vector can be discarded and the previous vector reused. This process is described in FIG. 5.

In FIG. 5, the vector hash that is computed is not a cryptographic hash. In some embodiments, the vector hash can be a 4-byte hash value based on the contents of a vector. The hash is used to index vectors but is not unique: multiple vectors can collide on a given hash. That is, different vectors may wind up with the same 4-byte hash.

Figure 17:
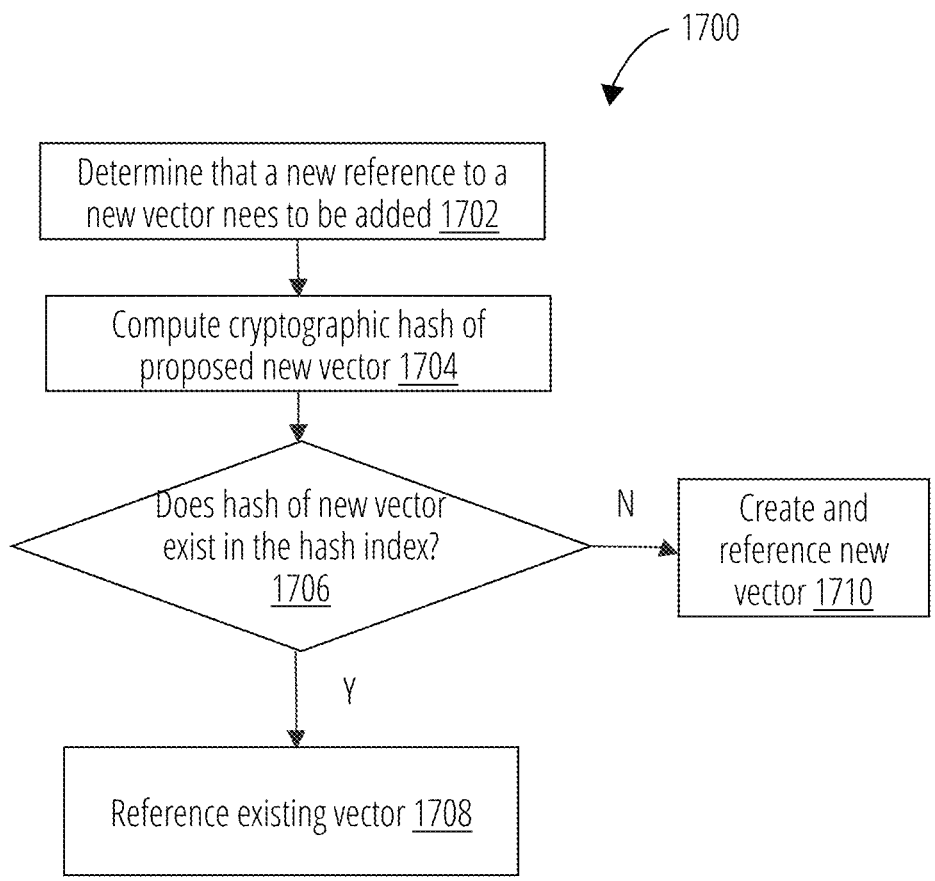
FIG. 17 shows an exemplary process by which a vector implementation of a database can determine whether a new vector needs to be created, or whether an existing vector can be re-used, according to some embodiments.

FIG. 17 depicts an exemplary process 1700 by which a vector implementation of a database can determine whether a new vector needs to be created, or whether an existing vector can be re-used, according to some embodiments. At step 1702, process 1700 can determine that a new reference to a vector needs to be added. This can be because a new record is being added, or because an existing record is being modified or updated.

At step 1704, process 1700 can compute a cryptographic hash of the proposed new vector. This hash computation can be done using any known hashing method that converts the proposed new vector into a shorter string or sequence of data.

At step 1706, process 1700 can compare the hash of the proposed new vector against hashes of vectors in a pool of vectors. If the hash of the proposed new vector does not match any hashes of vectors in the pool of vectors, process 1700 can branch to step 1708, where the process can create, store, and reference a new vector. If, however, the hash of the proposed new vector does match one or more hashes of vectors in the pool of vectors, process 1700 can branch to step 1710, where the process 1700 inserts a reference to the existing vector rather than creating a new vector.

Compared to the process 500 in FIG. 5, process 1700 does not require the intermediate step 510 of process 500, since the matching of the hash of the proposed new vector with the hash of a vector already in the vector pool, indicates that the proposed new vector is already in the pool. There is no need to check the contents of the vectors, since the hashes are unique identifiers.

Identification of vectors using VHashs can have several advantages over use of VIDs for identifying vectors.

For example, vector pooling (using the same vector in multiple places) enables vector tables to achieve significantly smaller storage for data than the corresponding data table would. However, the system vector pool has a number of differences in implementation between the use of VIDs and the use of VHashs.

For example, given a VID, a vector can be looked up in the vector store efficiently based on an index of VIDs. But given a vector of data (for example a vector of dates a user has entered), its VID cannot be identified. This causes inefficiencies when pooling vectors.

Furthermore, where the vector pool is primarily organized by VIDs, each VID can be looked up in a VID index (of the vectors in the vector pool) to retrieve a copy of the vector. There is also a separate index based on a 4-byte hash of the vector contents. This 4-byte hash index is required during data change/entry operations when new vectors are constructed based on a user's input. The system decides if these new vectors match existing vectors. An example of such a process is provided in FIG. 5. This process uses a traditional hash table technique: the 4-byte hash that is generated is not unique but is used as an index into a hash table. If a new vector has the same 4-byte hash as an existing vector in the vector pool, the contents of the vectors are then byte-wise compared to establish if they are actually identical.

However, when the vectors are each indexed by a cryptographic hash that is unique and based on the contents of the vector, there is no need for VIDs or a separate index based on a non-unique hash, as shown in FIG. 16.

For example, each component vector (e.g. date vectors, quantity vectors, parts vectors, etc.), when stored in memory or persisted to non-volatile storage, is associated with one index—namely its cryptographic hash. When VIDs are used, each vector is referenced by both its VID and its non-cryptographic hash, requiring more storage. This results in further memory space savings.

Furthermore, when a new vector is entered, it is evaluated to see if it is already in the vector store or not. When each vector in the vector store is referenced according to its unique cryptographic hash (i.e. Vhash), the Vhash of the new vector can be calculated and compared to the index of VHashs to know if the new vector is already present, without actually checking the contents of matching vectors, as shown, for example, in FIG. 17. This is in contrast to the case when VIDs are used: the contents of a vector with a matching has must be checked with the new vector (see FIG. 5). If the new vector is not in the vector store, its Vhash is indexed into the Vhash index; there is no need to assign an arbitrary VID. This increases the efficiency of data processing and data storage.

Another advantage is as follows. In some embodiments (e.g. FIG. 3), in order to determine whether the system already had assigned a VID to a given vector of data, the system needs to have all vectors uploaded in memory. However, when cryptographic VHashs are used (instead of VIDs), such a requirement is not necessary. The system stores all of vectors on disk indexed by VHashs. When a user provides a vector in memory, its hash can be computed from its contents which can then be compared to the index of VHashs in memory (see FIG. 16). There is no need to examine all of the vectors, since the index will indicate whether the vector introduced by the user, is present in the vector pool.

The implementations described herein can be implemented for both in-memory storage and disk-based storage. Re-use of vectors can provide an improvement but is not a necessary aspect of the systems and methods described herein. Furthermore, the systems and methods described herein can be implemented without versioning of the database. Vectors can also be compressed with run-length encoding to get further savings on disk and possibly in memory. Included here is the possibility of using deltas to handle changes across versions. However, neither use of run-length encoding nor use of deltas are necessary features of the systems and methods described herein.

The systems and methods can be implemented in a processor using hardware and/or software processing, with a processor that can include one or more general purpose CPUs, and/or special purpose processing. The processor can include execution circuitry and memory for storing data and instructions. The system can be used to save data in in-system memory, or on other data storage media including magnetic or optical media. The memory can reside in one location or in multiple locations. Interfaces can also be provided between the processor and memory. Instructions to be executed by processing circuitry can be stored in various types of memory in a non-transitory manner.

What is claimed is:

1. A data storage and retrieval system for a computer memory, the system comprising:
   at least one processor for configuring the computer memory to store data in accordance with a first header table, a first Vhash vector, a first set of two or more data vectors, a second header table, a second Vhash vector and a second set of two or more data vectors;
   wherein:
   each of: the first Vhash vector, the two or more data vectors from the first set, the second Vhash vector, and the two or data vectors from the second set are each assigned a respective unique identifier that is a content-based hash;
   the first header table includes an association between a first key label and a first Vhash Vector Hash, the first Vhash Vector Hash being a unique memory location reference associated with the first Vhash vector;
   each element of the first Vhash vector is configured to store a unique memory location reference associated with a corresponding data vector of the first set of data vectors;
   each element of each data vector of the first set of data vectors is configured to store a payload of data corresponding to a field associated with the first key label;
   each data vector of the first set of data vectors has an identical number of elements;
   the second header table includes an association between a second key label and a second Vhash Vector Hash, the second Vhash Vector Hash being a unique memory location reference associated with the second Vhash vector;
   each element of the second Vhash vector is configured to store a unique memory location reference associated with a corresponding data vector of the second set of data vectors;
   each element of each data vector of the second set of data vectors is configured to store a payload of data corresponding to a field associated with the second key label;
   each data vector of the second set of data vectors has an identical number of elements as each data vector of the first set of data vectors; and
   the first set of data vectors and the second set of data vectors have at least one data vector in common; and
   the first Vhash vector and the second Vhash vector each have at least one element configured to store a unique memory location reference in common, the at least one element configured to store a unique memory location reference in common in the first Vhash vector and the second Vhash vector is associated with the at least one data vector in common.

2. The system of claim 1, wherein the content-based hash is a cryptographic hash.

3. The system of claim 2, wherein the cryptographic hash is at least 16 bytes.

4. The system of claim 1, wherein:
   within the first set of data vectors, one of the data vectors is a first key vector, and each of the two or more data vectors of the first set of data vectors is sorted according to an order determined by the first key vector; and
   within the second set of data vectors, one of the data vectors is a second key vector, and each of the two or more data vectors of the second set of data vectors is sorted according to an order determined by the second key vector.

5. The system according to claim 4, wherein the first key vector is identical to the second key vector.

6. The system of claim 1, wherein the at least one processor is further configured to:
   determine a proposed new data vector to be referenced by the second Vhash vector;
   determine whether the computer memory is already storing a matching data vector that matches the proposed new data vector;
   when the computer memory is already storing the matching data vector, store a unique memory location reference associated with the matching data vector in the second Vhash vector; and
   when the computer memory is not already storing the matching data vector, store the proposed new data vector in the computer memory, and store a unique memory location reference associated with the proposed new data vector in the second Vhash vector.

7. The computer system of claim 6, wherein the at least one processor is further configured to determine whether the computer memory is already storing the matching data vector that matches the proposed new data vector by comparing a cryptographic hash of the proposed new data vector with a cryptographic hash of each data vector already stored in the computer memory.

8. The computer system of claim 1, wherein each data vector in the first set of data vectors comprises a subset of elements associated with a first group label, and wherein the computer memory further comprises a third header table that stores an association between the first group label and the first Vhash Vector Hash associated with the first Vhash vector.

9. The computer system of claim 1, wherein each element in the second Vhash Vector stores a unique memory location reference associated with a data vector having a subset of elements associated with the first group label, and wherein the third header table further stores an association between the first group label and the second Vhash Vector Hash associated with the second Vhash vector.

10. The system of claim 1, wherein:
    the first Vhash vector is associated with a first version;
    the second Vhash vector associated with a second version; and
    the first header table further stores:
    an association between the first Vhash vector and the first version; and
    an association between the second Vhash vector and the second version.

11. A method of storing and retrieving data in a computer memory, the method comprising:
    configuring, by a processor, the computer memory to store data in accordance with a first header table, a first Vhash vector, a first set of two or more data vectors, a second header table, a second Vhash vector and a second set of two or more data vectors;
    wherein:
    each of: the first Vhash vector, the two or more data vectors from the first set, the second Vhash vector, and the two or data vectors from the second set are each assigned a respective unique identifier that is a content-based hash;
    the first header table includes an association between a first key label and a first Vhash Vector Hash, the first Vhash Vector Hash being a unique memory location reference associated with the first Vhash vector;

each element of the first Vhash vector is configured to store a unique memory location reference associated with a corresponding data vector of the first set of data vectors;

each element of each data vector is configured to store a payload of data corresponding to a field associated with the first key label;

each data vector of the first set of data vectors has an identical number of elements;

the second header table includes an association between a second key label and a second Vhash Vector Hash, the second Vhash Vector Hash being a unique memory location reference associated with the second Vhash vector;

each element of the second Vhash vector is configured to store a unique memory location reference associated with a corresponding data vector of the second set of data vectors;

each element of each data vector of the second set of data vectors is configured to store a payload of data corresponding to a field associated with the second key label;

each data vector of the second set of data vectors has an identical number of elements as each data vector of the first set of data vectors;

the first set of data vectors and the second set of data vectors have at least one data vector in common; and the first Vhash vector and the second Vhash vector each have at least one element configured to store a unique memory location reference in common, the at least one element configured to store a unique memory location reference in common in the first Vhash vector and the second Vhash vector is associated with the at least one data vector in common.

12. The method of claim 11, wherein the content-based hash is a cryptographic hash.

13. The method of claim 12, wherein the cryptographic hash is at least 16 bytes.

14. The method of claim 11, wherein:

within the first set of data vectors, one of the data vectors is a first key vector, and each of the two or more data vectors of the first set of data vectors is sorted according to an order determined by the first key vector; and within the second set of data vectors, one of the data vectors is a second key vector, and each of the two or more data vectors of the second set of data vectors is sorted according to an order determined by the second key vector.

15. The method according to claim 14, wherein the first key vector is identical to the second key vector.

16. The method of claim 11, further comprising:

determining, by the processor, a proposed new data vector to be referenced by the second Vhash vector;

determining, by the processor, whether the computer memory is already storing a matching data vector that matches the proposed new data vector;

when the computer memory is already storing the matching data vector, storing, by the processor, a unique memory location reference associated with the matching data vector in the second Vhash vector; and when the computer memory is not already storing the matching data vector, storing, by the processor, the proposed new data vector in the computer memory; and storing, by the processor, a unique memory location reference associated with the proposed new data vector in the second Vhash vector.

17. The method of claim 16, wherein the determining whether the computer memory is already storing the matching data vector that matches the proposed new data vector comprises comparing, by the processor, a cryptographic hash of the proposed new data vector with a cryptographic hash of each of the data vectors already stored in the computer memory.

18. The method of claim 11, wherein each data vector in the first set of data vectors comprises a subset of elements associated with a first group label, the method further comprising storing, by the processor in the computer memory, a third header table that stores an association between the first group label and the first Vhash Vector Hash associated with the first Vhash vector.

19. The method of claim 18, wherein each element in the second Vhash vector stores a unique memory location reference associated with a data vector having a subset of elements associated with the first group label, the method further comprising storing, by the processor, in the third header table, an association between the first group label and the unique memory location reference associated with the second Vhash vector.

20. The method of claim 11, wherein:

the first Vhash vector is associated with a first version;

the second Vhash vector associated with a second version; and the first header table further stores:

an association between the first Vhash vector and the first version; and an association between the second Vhash vector and the second version.

21. A computer memory comprising: a first header table, a first Vhash vector, a first set of two or more data vectors, a second header table, a second Vhash vector and a second set of two or more data vectors, wherein:

each of: the first Vhash vector, the two or more data vectors from the first set, the second Vhash vector, and the two or data vectors from the second set are each assigned a respective unique identifier that is a content-based hash;

the first header table includes an association between a first key label and a first Vhash Vector Hash, the first Vhash Vector Hash being a unique memory location reference associated with the first Vhash vector;

each element of the first Vhash vector is configured to store a unique memory location reference associated with a corresponding data vector of the first set of data vectors;

each element of each data vector of the first set of data vectors is configured to store a payload of data corresponding to a field associated with the first key label;

each data vector of the first set of data vectors has an identical number of elements;

the second header table includes an association between a second key label and a second Vhash Vector Hash, the second Vhash Vector Hash being a unique memory location reference associated with the second Vhash vector;

each element of the second Vhash vector is configured to store a unique memory location reference associated with a corresponding data vector of the second set of data vectors;

each element of each data vector of the second set of data vectors is configured to store a payload of data corresponding to a field associated with the second key label;

each data vector of the second set of data vectors has an identical number of elements as each data vector of the first set of data vectors;

the first set of data vectors and the second set of data vectors have at least one data vector in common; and the first Vhash vector and the second Vhash vector each have at least one element configured to store a unique memory location reference in common, the at least one element configured to store a unique memory location reference in common in the first Vhash vector and the second Vhash vector is associated with the at least one data vector in common.

22. The computer memory of claim 21, wherein the content-based hash is a cryptographic hash.

23. The computer memory of claim 22, wherein the cryptographic hash is at least 16 bytes.

24. The computer memory of claim 21, wherein:

within the first set of data vectors, one of the data vectors is a first key vector, and each of the one or more data vectors of the first set of data vectors is sorted according to an order determined by the first key vector; and within the second set of data vectors, one of the data vectors is a second key vector, and each of the one or more data vectors of the second set of data vectors is sorted according to an order determined by the second key vector.

25. The computer memory according to claim 24, wherein the first key vector is identical to the second key vector.

26. The computer memory of claim 21, further configured to:

determine a proposed new data vector to be referenced by the second Vhash vector;

determine whether the computer memory is already storing a matching data vector that matches the proposed new data vector;

when the computer memory is already storing the matching data vector, store a unique memory location reference associated with the matching data vector in the second Vhash vector; and when the computer memory is not already storing the matching data vector, store the proposed new data vector in the computer memory, and store a unique memory location reference associated with the proposed new data vector in the second Vhash vector.

27. The computer memory of claim 26, further configured to determine whether the computer memory is already storing the matching data vector that matches the proposed new data vector by comparing a cryptographic hash of the proposed new data vector with a cryptographic hash of each data vector already stored in the computer memory.

28. The computer memory of claim 21, wherein each data vector in the first set of data vectors comprises a subset of elements associated with a first group label, and wherein the computer memory further comprises a third header table that stores an association between the first group label and the first Vhash Vector Hash associated with the first Vhash vector.

29. The computer memory of claim 28, wherein each element in the second Vhash vector stores a unique memory location reference associated with a data vector having a subset of elements associated with the first group label, and wherein the third header table further stores an association between the first group label and the second Vhash Vector Hash associated with the second Vhash vector.

30. The computer memory of claim 21, wherein:

the first Vhash vector is associated with a first version;

the second Vhash vector associated with a second version; and the first header table further stores:

an association between the first Vhash vector and the first version; and an association between the second Vhash vector and the second version.

\* \* \* \* \*